US009908239B1

(12) United States Patent
O'Brien et al.

(10) Patent No.: US 9,908,239 B1
(45) Date of Patent: Mar. 6, 2018

(54) MOBILE ROBOT SYSTEM

(71) Applicant: Amazon Technologies, Inc., Reno, NV (US)

(72) Inventors: Kevin Patrick O'Brien, Redmond, WA (US); Jignesh Gandhi, Ashburn, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/303,545

(22) Filed: Jun. 12, 2014

(51) Int. Cl.
  *B25J 9/16* (2006.01)
  *B25J 5/00* (2006.01)
  *G05D 1/00* (2006.01)
  *B25J 9/02* (2006.01)

(52) U.S. Cl.
  CPC ............... *B25J 9/1666* (2013.01); *B25J 9/02* (2013.01); *G05D 1/0011* (2013.01); *G05D 2201/0216* (2013.01); *Y10S 901/01* (2013.01); *Y10S 901/14* (2013.01); *Y10S 901/47* (2013.01)

(58) Field of Classification Search
  CPC ... G05D 2201/0207; G05D 2201/0216; G05D 23/1931; G05D 1/0011; G05B 2219/40298; G05B 2219/45066; G05B 2219/50276; B25J 19/023; B25J 5/00; B25J 9/1666; B25J 9/02; F24F 2221/42; Y10S 901/14; Y10S 901/47; Y10S 901/01
  USPC ......................................................... 700/259
  See application file for complete search history.

(56) References Cited

U.S. PATENT DOCUMENTS

| 7,072,739 B2 * | 7/2006 | Bash ................... | G05D 1/0246 700/245 |
| 8,457,826 B2 * | 6/2013 | D'Amico ............. | H05K 7/1488 429/428 |
| 8,913,850 B2 * | 12/2014 | Calio .................. | G06Q 10/087 382/291 |
| 2004/0243280 A1 * | 12/2004 | Bash ................... | G05D 1/0246 700/245 |

(Continued)

OTHER PUBLICATIONS

Chan, et al. "A Robot as Mobile Sensor and Agent in Data Center Energy Management," IBM Dept of Computer Science, Rutgers Univ, ICAC 2011: Jun. 14-18, Karlsruhe, Germany, pp. 1-14.

(Continued)

*Primary Examiner* — Jason Holloway
(74) *Attorney, Agent, or Firm* — Robert C. Kowert; Meyertons, Hood, Kivlin, Kowert & Goetzel, P.C.

(57) ABSTRACT

A mobile robot for responding to computer system issues travels to and interacts with a specific computer system in a data center based on a command from a central control system. The mobile robot can collect environmental data from a location proximate to a specific computer system, communicatively couple to a specific computer system via engaging a communication connector with an interface of the specific computer system, collect data from a specific computer system via the coupling to the specific computer system, establish a remote communication link between the specific computer system and a remote computer system, and send the collected data to a remote computer system or process the collected data. The mobile robot can manipulate one or more manipulable arms to remove a component part from a specific computer system and install a replacement component part in a specific computer system.

14 Claims, 12 Drawing Sheets

(56) References Cited

U.S. PATENT DOCUMENTS

| | | | |
|---|---|---|---|
| 2005/0038562 A1* | 2/2005 | Bash | G05D 1/0274 700/245 |
| 2005/0096789 A1* | 5/2005 | Sharma | G05D 23/1931 700/245 |
| 2005/0154265 A1* | 7/2005 | Miro | A61B 5/0002 600/300 |
| 2011/0090663 A1* | 4/2011 | D'Amico | H05K 7/1488 361/809 |
| 2012/0078417 A1* | 3/2012 | Connell, II | B25J 5/00 700/248 |
| 2013/0211546 A1* | 8/2013 | Lawson | G05B 19/4185 700/9 |
| 2013/0231779 A1* | 9/2013 | Purkayastha | B25J 9/1697 700/259 |
| 2013/0339468 A1* | 12/2013 | Chang | G06F 11/00 709/213 |
| 2015/0294735 A1* | 10/2015 | Gao | G11C 29/56 714/718 |
| 2015/0336274 A1* | 11/2015 | Connell, II | B25J 9/1697 700/259 |

OTHER PUBLICATIONS

Industry Perspectives, "How a Robot Can Simplify Data Center Management," Data Center Knowledge, Aug. 26, 2013, pp. 1-4.
Bill Kleyman, "The Robot-Driven Data Center of Tomorrow," Data Center Knowledge, May 22, 2013, pp. 1-8.
Bill Kleyman, "The Role of Robotics in Data Center Automation," Data Center Knowledge, Dec. 18, 2013, pp. 1-5.
"Vigilant Robot FAQ," Vigilant Robots, downloaded from http://www.vigilantrobots.com/faq.html on Apr. 3, 2014, pp. 1-4.

* cited by examiner

US 9,908,239 B1

MOBILE ROBOT SYSTEM

BACKGROUND

Organizations such as on-line retailers, network-based service providers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Servers in a computing facility typically include several components that provide information about the server accessible from an aisle in front of the server or an aisle behind the server. Such components include indicator lights, identification tags, and communication ports. In addition, some servers include computing components that may be removed and replaced without removing the server from a rack in which it is mounted. For example, some servers are equipped with hard disk drives that can be removed by pressing an eject button while remaining hard drives and the server continue to function. Some servers use other mechanisms to allow hard drives to be swapped without removing the server from a rack in which it is mounted.

Servers comprising computers in a computing facility require inspection and periodic maintenance in order to meet customer expectations with respect to reliability. Periodic maintenance of computer systems may require planned and unplanned maintenance activities. In some situations, planned and unplanned maintenance activities require interaction with physical computer systems.

Figure 1:
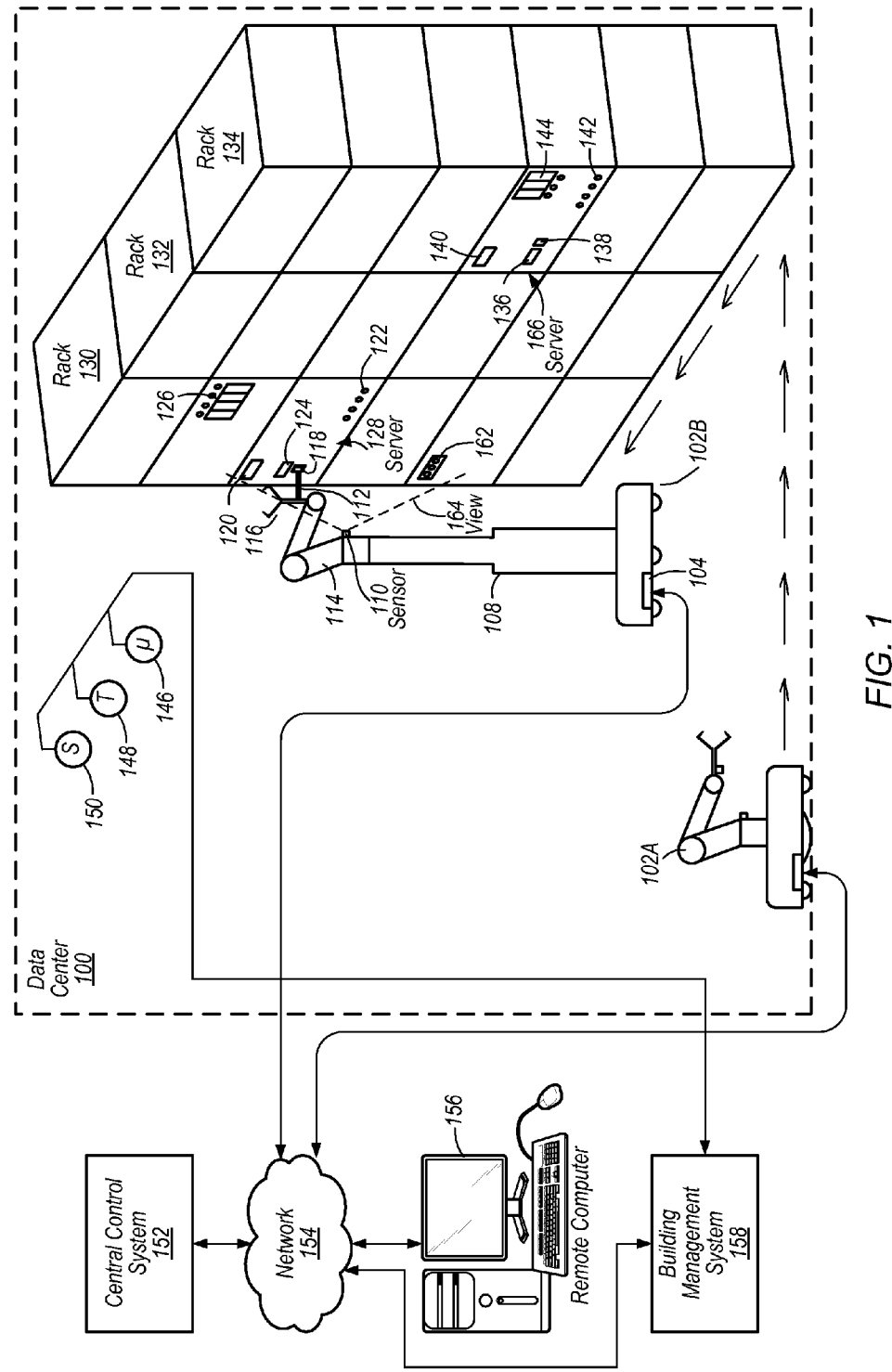
FIG. 1 illustrates a data center including a mobile robot system, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a mobile robot system, and systems and methods of employing a mobile robot to respond to events in a data center that are detected by a central control system are disclosed. A system employing a mobile robot for responding to computer system issues may include a central control system and a mobile robot. The mobile robot may include one or more manipulable arms and communication connectors attached to the manipulable arms so that the mobile robot may manipulate the communication connectors by manipulating the manipulable arms. The mobile robot may travel within a data center to a location next to a specific computer system in the data center, identify a specific communication port on the specific computer system, and connect one of the mobile robot's communication connectors to the identified specific port on the specific computer system to establish a local link between the mobile robot and the specific computer system. In order to connect the mobile robot's communication connector to the specific port, the mobile robot may manipulate one of the mobile robot's communication connectors using the mobile robot's manipulable arms to engage the communication connector with the identified specific port of the specific computer system. For example, a mobile robot may travel to a particular server located in a row of rack computer systems in a data center and after arriving at the specific computer system identify a Universal Serial Bus (USB) port on the front of the particular server. The mobile robot may then manipulate one of its arms that includes a USB connector to engage the USB connector included in the manipulable arm to the USB port of the particular server. Once the USB connector is engaged in the identified USB port, a local link between the particular server and the mobile robot may be formed.

A central control system communicatively coupled to the mobile robot may command the mobile robot to travel to a specific computer system and establish a local link. The central control system may command the mobile robot to form the local link and a remote link, where the remote link links the specific computer system to a remote computer system via the mobile robot and the local link between the mobile robot and the specific computer system. The central control system may receive data from the specific computer system via the remote link. For example, a central control system may command a mobile robot to travel to a server that is non-responsive. The central command system may also command the mobile robot to establish a local and remote link with the non-responsive server. The mobile robot may identify a USB port on the non-responsive server and connect a USB connector to the USB port to establish a local link between the mobile robot and the non-responsive server. The mobile robot may then establish a remote link with the central control system and the central control system may receive data from the non-responsive server via the local link formed by the USB connector of the mobile robot engaged in the USB port of the non-responsive server and the remote link between the mobile robot and the central control system.

According to some embodiments, a mobile robot includes one or more manipulable arms and one or more connectors coupled to the manipulable arms. The mobile robot may travel to a location next to a specific computer system, identify a port associated with the specific computer system based on observation of a space next to the specific computer system and establish a local link between the mobile robot and the specific computer system. The mobile robot may manipulate one or more of its manipulable arms to engage one of the mobile robot's connectors with the identified port of the specific computer system. For example, the mobile robot may travel to a rack comprising several rack mounted computer systems. Once arriving at the rack, the mobile robot may identify a power port on an uninterruptible power supply (UPS) associated with a specific computer system. The mobile robot may then establish a local link between the specific computer system and the mobile robot by manipulating a power connector attached to one of the mobile robot's manipulable arms to engage the power port on the UPS associated with the specific computer system.

According to some embodiments, a method of using a mobile robot for responding to computer system issues includes: determining an occurrence of an anomaly associated with a specific computer system in a group of computer systems based on sensor signals indicating that computing performance associated with the specific computer system meets a threshold, and commanding one or more mobile robots to travel to a location near the specific computer system and collect data associated with the specific computer system via one or more interfaces of the mobile robot. For example, sensors associated with a specific computer system may measure energy consumed per instruction executed by the specific computer system. A central control system may receive sensor signals from sensors measuring energy consumption per instruction executed and may determine the occurrence of an anomaly associated with the specific computer system if the energy consumed per instruction executed exceeds a predetermined threshold. The central control system may command a mobile robot to travel to the specific computer system and collect data. The mobile robot may collect environmental data including temperature, humidity, particulate concentrations, and other environmental measurements. The mobile robot may also communicatively couple with an Ethernet port of the specific computer system to access computer system diagnostic data. The mobile robot may also couple with a UPS to measure power supply factors. The mobile robot may analyze the data itself or send the data collected to a remote computer system for analysis.

As used herein, "authentication device" refers to a device for receiving identification data provided by an individual to identify the individual and determine whether the individual is authorized to access a certain region of the data center where a mobile robot is located. Identification data includes data from a magnetic strip on an identification card, a proximity card, and other like devices designed to store credentials issued to members of an organization. In addition, an authentication device may be a biometric authentication device including fingerprint readers, iris scanners, voice recognition devices, and other like devices capable of identifying a person based on biometric characteristics of the person.

As used herein, "computing performance" refers to the total effectiveness of a computer system including throughput, individual response time, and availability. Measurements of computing performance may include measurements of one or more of central processing unit (CPU) utilization, energy consumed per instruction executed, latency, bandwidth, some combination thereof, and other like measurements relating to the performance of a computer system.

As used herein, "local communication link" refers to a communication pathway between two or more physically proximate computer systems that includes a physical connection of communication interfaces of the two or more computers. A local communication link may be established by a connector associated with one computer system being connected with a port of another computer system. Local communication links can be established between communication interface, including Universal Serial Bus (USB) ports and connectors, Ethernet ports and connectors, power "outlet" ports and power "plug" connectors, etc.

As used herein, "recurring computer system interaction tasks" refers to tasks that are performed on repeating intervals and require interaction with one or more computer systems. A recurring computer system interaction task can include a weekly inventory of all the identification numbers of computer systems in a data center, a daily task to observe status indicators associated with computer systems in a data center, other like tasks that require travel to a specific computer system, etc.

As used herein, "remote communication link" refers to a communication pathway between two physically remote computer systems. For example a mobile robot located at a specific computer system may establish a remote communication link, via a wireless communication network, with a remote computer located in a separate location that is physically remote from the mobile robot.

As used herein, "secondary power support" refers to providing electrical power support to one or more computing systems via an electrical connection with a secondary power source, which can include a generator, uninterruptable power supply (UPS), etc.

FIG. 1 illustrates a data center including a mobile robot system, according to some embodiments. Data center 100 includes racks 130, 132, and 134. Each rack comprises multiple computer systems. For example, rack 134 includes computer system 166 and rack 130 includes computer system 128. Computer systems 128 and 166 are representative computer systems of the several computer systems in racks 130, 132, and 134. Computer system 128 includes identification tag 120, universal serial bus (USB) communication port 124, Ethernet communication port 118, and indicator lights 122. Computer system 166 includes identification tag 140, USB communication port 136, Ethernet communication port 138, indicator lights 142, and mass storage device 144. A mass storage device can, in some embodiments, include one or more hard disk drives (HDDs). Building management system (BMS) 158 is coupled to particulate sensor 146, temperature sensor 148, and smoke sensor 150. Network 154 is communicatively coupled to central control system 152, remote computer system 156, BMS 158, racks 130, 132, and 134, and mobile robot 102. In some embodiments, network 154 includes one or more networks, including a wireless communication network. In some embodiments, BMS 158 may be central control system 152. In FIG. 1, mobile robot 102 is depicted in two modes. Mobile robot 102A is the mobile robot 102 in the standby mode and is waiting to receive a command from central control system 152. Mobile robot 102B represents the same mobile robot as mobile robot 102A after receiving a command from central control system 152 to communicatively couple to computer system 128.

Central control system 152 is communicatively coupled with computer systems in racks 130, 132, and 134 via network 154. Central control system 152 is also communicatively coupled to BMS 158 and monitors signals from particulate sensor 146, temperature sensor 148, and smoke sensor 150 to BMS 158. In some embodiments, central control system 152 determines the occurrence of an event associated with a specific computer system based on computer system performance data received from computer systems in racks 130, 132, and 134 via network 154. An event may be an anomaly in the performance of the specific computer system. In some embodiments, central control system 152 determines the occurrence of an event associated with a specific computer system based on sensor signals from one or more of particulate sensor 146, temperature sensor 148, and smoke sensor 150. An event may be an environmental condition that affects the performance of the specific computer system, a hardware failure, etc. For example, particulate sensor 146 may detect a high concentration of particulates from maintenance activity in data center 100 that exceeds a predetermined threshold for particulate concentrations. Central control system 152 may determine the occurrence of an event based at least in part upon BMS 158 relaying the particulate sensor signal to central control system 152, BMS 158 determining that the particulate concentration meets a predetermined threshold and sending central control system 152 a notification of an event, the central control system directly collecting the sensor signals as the sensor signals travel from sensors 146, 148, and 150 to BMS 158, etc.

In another example, a computer performance event may be associated with computer system 166. For example, computer system 166 may have high central processing unit (CPU) utilization for an extended period of time. Central control system 152 may monitor computing performance of computer system 166, including monitoring CPU utilization via network 154, and may determine the occurrence of an event if the CPU utilization of computer system 166 meets a predetermined threshold for a set period of time.

Mobile robot 102 comprises one or more computer systems each of which can comprise one or more processors and memory capable of storing process instructions and data. Mobile robot 102 comprises adjustable height lift 108, manipulable arm 114, gripping device 116, and communication connector 112. Mobile robot 102 includes a network communication interface module 104 for interacting with central control system 152 and one or more remote computers 156 via network 154. In some embodiments, the memory of mobile robot 102 may store a map of each floor tile in data center 100. In some embodiments, map information may be stored in memory of central control system 152 and accessed by mobile robot 102. Mobile robot 102 may utilize the map of each floor tile in data center 100 to navigate in data center 100. For example, mobile robot 102 may receive a command to travel to and interact with computer system 128 from a stand-by location in data center 100 depicted as mobile robot 102A. Mobile robot 102 may determine that a first step in the route to computer system 128 is to travel five floor tiles from the stand-by location to rack 134, and that a second step in the route to computer system 128 is to travel an additional three floor tiles to rack 130 after making a left turn at rack 134 based at least upon the map stored in memory. Mobile robot 102 may use sensor 110 to count floor tiles. Upon determining that mobile robot has arrived at rack 130, mobile robot 102 may use sensor 110 to identify computer system 128 in rack 130 by scanning identification tags 162 and 120. Sensor 110 has a field of view 164 that can encompass multiple computer systems, so that sensor 110 can concurrently scan identification tags included on multiple computer systems. In some embodiments, sensor 110 is a camera, and the camera may be adjusted to zoom in and out to focus on one or more portions of one or more computer systems in rack 130. In some embodiments, mobile robot 102 can provide a camera feed of image data from sensor 110 to remote computer system 156, central control system 152, etc. based on mobile robot 102 arriving at a location proximate to the computer system the mobile robot was commanded to interact with. For example, mobile robot 102 may begin to provide a camera feed to remote computer system 156 after making the left turn at rack 134 and traversing the remaining three floor tiles to arrive at rack 130 that comprises computer system 128.

For example, in response to determining the particulate concentration in data center 100 proximate to computer system 128 meets one or more predetermined thresholds, central control system 152 may command mobile robot 102, via network 154, to travel to computer system 128 and communicatively couple with computer system 128. In response to receiving the command, mobile robot 102 travels towards computer system 128 based on a route determined by mobile robot 128 or included in the command from central control system 152. Mobile robot 102B uses sensor 110 to determine which computer system in rack 130 is computer system 128. Sensor 110 may be a camera, and mobile robot 102 may use the camera to identify computer system 128 based at least in part upon capturing an image of identification tag 120 of computer system 128 and analyzing the captured image of identification tag 120 to correlate identifying information on identification tag 120 with a database of computer systems in the data center 100 and corresponding identification information. In some embodiments, sensor 110 is a radio frequency sensor that detects a radio signal emitted from identification tag 120 that uniquely identifies computer system 128, where identification tag 120 includes a radio frequency identification device (RFID). Sensor 110 may include a bar code scanner and identification tag 120 may be a bar code that identifies computer system 128; mobile robot 102 may determine which computer system in rack 130 is computer system 128 by scanning bar codes located on identification tags of the computers in rack 130 such as identification tag 162 and 120.

FIG. 1 depicts mobile robot 102B interacting with computer system 128 after identifying computer system 128. Adjustable height lift 108 allows a portion of mobile robot 102B to rise in front of rack 130 so that view 164 of sensor 110 can be adjusted to view computer system 128. Mobile robot 102B uses sensor 110 to locate Ethernet communication port 118 located on the front of computer system 128. In some embodiments, sensor 110 may be a camera and mobile robot 102B may identify Ethernet port 118 based at least in part on images captured by sensor 110 of a portion of computer system 128 that includes Ethernet port 118. In some embodiments, mobile robot 102 may send images from sensor 110 to central control system 152, and central control system 152 may identify Ethernet port 110 based at least in part upon analysis of the images. Mobile robot 102B may also provide images from sensor 110 to remote computer 156 and data center personnel may identify Ethernet port 118 based on images received at remote computer system 156. Based at least in part upon identifying Ethernet port 118, mobile robot 102B can manipulate manipulable arm 114 and gripping device 116 so that communication connector 112, which can include an Ethernet connector, is positioned in front of identified Ethernet port 118 on computer system 128. After positioning communication connector 112 in front of Ethernet port 118, mobile robot 102B manipulates manipulable arm 114 so that communication connector 112 engages with Ethernet port 118 and establishes a local communication link between computer system 128 and mobile robot 102B.

In some embodiments, server 128 may comprise one or more application program interfaces that allow mobile robot 102B to collect diagnostic data relating to server 128 via communication connector 112 coupled with Ethernet port 118 of server 128. In some embodiments, server 128 may include a system console. Mobile robot 102B may connect with a port 118 that enables the mobile robot 102B to access the system console of server 128, collect data about the server 128 via the system console, etc. In some embodiments, server 128 may comprise a failed component that prevents server 128 from operating normally and mobile robot 102B may couple with server 128 to collect data from non-failed components of server 128.

In some embodiments, mobile robot 102A may be docked in a docking station while in standby mode. The docking station may include a charger which charges one or more batteries included in mobile robot 102A.

In some embodiments, mobile robot 102B may collect and process data from computer system 128 via the local communication link. For example, if the command from the central control system is for mobile robot 102 to communicatively couple with a specific computer system, and the command was in response to a computing performance event such as a high CPU utilization rate, mobile robot 102B may process data collected via the local link established by communication connector 122 engaged in Ethernet port 118. In some embodiments, mobile robot 102B may form a remote link between computer system 128 and central control system 152 via network communication interface module 104 so that computer system 128 is communicatively coupled to central control system 152 via the local link between mobile robot 102B and computer system 128 and the remote link between mobile robot 102B and central control system 152. Central control system 152 may then collect and process data received from computer system 128 via the local and remote links.

Figure 2:
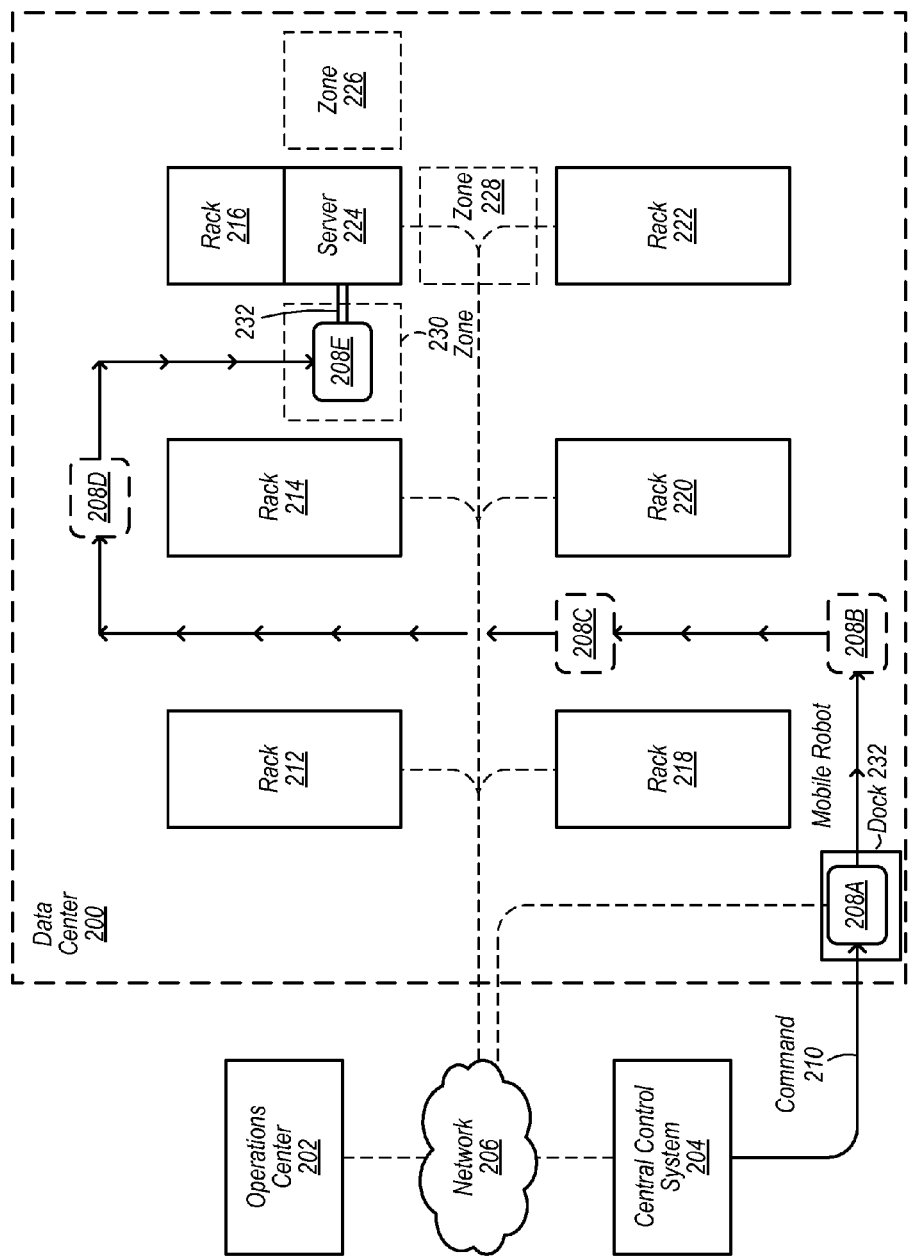
FIG. 2 illustrates a schematic view of a data center in which a mobile robot interacts with computer systems, according to some embodiments.

FIG. 2 illustrates a schematic view of a data center in which a mobile robot interacts with computer systems, according to some embodiments. Mobile robot 208 is depicted in FIG. 2 in five states, illustrated as 208A-E. Data center 200 includes racks 212, 214, 216, 218, 220, and 222. Mobile robot 208, where depicted as mobile robot 208A, is in standby mode and coupled to dock 232 in the corner of data center 200. Dock 232 is configured to charge one or more batteries included in mobile robot 208 while mobile robot 208 is in standby mode. Operations center 202 is depicted as outside data center 200. In some embodiments operations center 202 may be in the same data center as data center 200 or in a remote location. Central control system 204 is depicted as outside data center 200. In some embodiments central control system 204 may be implemented on a computer system in data center 200, on a remote computer system not located in data center 200, etc. Network 206 links operations center 202, central control system 204, racks 212, 214, 216, 218, 220, 222, and mobile robot 208.

Mobile robot 208 receives command 210 from central control system 204. In FIG. 2 command 210 is depicted as being sent directly from central control system 204 to mobile robot 208A. In some embodiments, command 210 may be sent to mobile robot 208 via one or more intermediate networks. Various methods known in the art may be used to send command 210 including, radio frequency transmitters and receivers, wireless networks, and data center networks including network 206, etc. Network 206 may include a wireless network. Command 210 may be a command to perform a recurring computer system interaction task including taking inventory of the computer systems located in data center 200. Mobile robot 208 may follow a predetermined path between racks, scanning the identification tags of each computer system in racks 212, 214, 216, 218, 220, and 222. The recurring task may be used to track the location of each computer system in data center 200 and ensure that no computer systems are missing or unaccounted for in data center 200. In some embodiments, mobile robot 208 may observe status indicator lights located on the front of computer systems in racks 212, 214, 216, 218, 220, and 222. The indicator light status may be recorded with the identification number of each computer system to keep a record of which computer system has indicator lights indicating a computer system issue. Mobile robot 208, in some embodiments, reports any computer systems with indicator lights indicating a computer system issue to central control system 204, and central control system 204 may alert data center personnel of the computer system with the indicator light indicating a computer system issue. In some embodiments, mobile robot 208 collects environmental data including temperature, humidity, particulate concentration, and smoke presence as it conducts the inventory of the computer systems in data center 200.

Mobile robot 208 may then receive a command to conduct an inventory of data center 200 from central control system 204. Mobile robot 208B depicts mobile robot 208 beginning an inventory. In some embodiments, mobile robot 208 may store a map of data center 200 in memory and may calculate a path to follow to conduct the inventory of data center 200, mobile robot 208 may determine to make a left hand turn between rack 218 and 220 based at least in part on the calculated path. In some embodiments, central control system 204 may store a map of data center 200 in memory and mobile robot 208 may access the map stored in the memory of central control system 204 to calculate a path to follow to conduct an inventory of data center 200. In some embodiments, a command, received at the mobile robot from a control system, to conduct an inventory of data center 200 may include a specified path through the data center for mobile robot 208 to navigate in order to conduct the inventory. In some embodiments, mobile robot 208 may not rely on a map and traverse data center 200 in a random manner until all known computer systems are identified. In some embodiments, mobile robot 208 comprises a camera which counts floor tiles in front of mobile robot 208 as it traverses data center 200. Mobile robot 208 may count floor tiles to navigate in data center 200. In some embodiments, mobile robot 208 may comprise a gyroscope or compass and accelerometers that enable it to calculate its current position and orientation based on a known starting position and measurements from the gyroscope or compass and accelerometers. In some embodiments, other known methods in the art may be used by mobile robot 208 for navigation.

In some embodiments, one or more regions of a data center, including one or more particular floor tiles in a data center, represent a zone. In FIG. 2 zones 226, 228, and 230 are located on each side of specific computer system 224. Each of zones 226, 228, and 230 may be a floor tile mapped in central control system 204 or mapped in a memory of mobile robot 208. Central control system 204 may command mobile robot to travel to a specific floor tile that represents a zone in relation to a specific computer system. Different zones may be associated with different tasks to be performed on a specific computer system. Zones 226, 228, and 230 associated with computer system 224 may be associated with computer system 224 in a map of data center 200 stored in the memory of mobile robot 208 or in a map stored in the memory of central control system 204. As an example, a command to perform a task involving scanning indicator lights on a specific computer system may specify a zone in front of the specific computer system from which the indicator lights are viewable. For example, central control system may identify the occurrence of an event affecting computer system 224 and command mobile robot 208 to travel to zone 230 in front of computer system 224 so that the indicator lights on computer system 224 may be observed via a camera mounted on mobile robot 228.

Mobile robot 208 may comprise scanners on both the left and right side of mobile robot 208 so that mobile robot 208 can scan identification tags on computer systems in racks 218 and 220 as mobile robot 208 travels a path between racks 218 and 220. In some embodiments, mobile robot 208 may develop its own map of data center 200 by scanning computer system identification tags and storing computer system identification numbers and location information in a memory as mobile robot 208 travels throughout data center 200. In some embodiments, mobile robot 208 may determine the path to a specific computer system based on map information stored in the memory of mobile robot 208. In some embodiments, central control system 204 may calculate the path to a specific computer system and include in a command to mobile robot 208 a path for mobile robot 208 to follow to arrive at a specific computer system.

While taking inventory of computer systems in racks 218 and 220, mobile robot 208 may receive an additional command from central control system 204 directing mobile robot 208 to travel to a computer system 224 in rack 216 based on central control system 204 determining the occurrence of an event affecting computer system 224. The additional command may further specify a particular zone proximate to computer system 224 to which mobile robot 208 is to travel. In FIG. 2, computer system 224 is associated with zone 230 located in front of computer system 224, zone 228 located to the side of computer system 224 and zone 226 located behind computer system 224. Mobile robot 208E depicts mobile robot 208 arriving at zone 230 located in front of computer system 224.

Mobile robot 208E is connected to computer system 224 via connection 232. Connection 232 may be a communication connector of mobile robot 208E engaged in a communication port of computer system 224. Connection 232 may be a power outlet connector of mobile robot 208, connected to an uninterruptible power supply of mobile robot 208, that is engaged in a power port of a rack level power distribution unit coupled to computer system 224. In some embodiments, other types of connections may be established between mobile robot 208 and computer system 224.

Central control system 204 may command mobile robot 208 to travel to computer system 224 and connect to computer system 224 in response to determining the occurrence of an event indicating an anomaly associated with specific computer system 224, based on receiving one or more sensor signals indicating that the computing performance of computer system 224 at least meets a predetermined threshold. Sensor signals that may indicate computing performance include, CPU utilization, energy consumed per instruction executed, latency, bandwidth, and any other factor relating to the performance of computer system 224.

Data center 200 may include racks 130, 132, and 134 described in FIG. 1. Also, operations center 202 may be included in the configuration depicted in FIG. 1. Remote computer system 154 and BMS 158 described in FIG. 1 may be included in the configuration depicted in FIG. 2. Data center 200 may include sensors 146, 148, and 150 depicted in FIG. 1. Mobile robot 208 in FIG. 2 may be mobile robot 102 depicted in FIG. 1.

Figure 3:
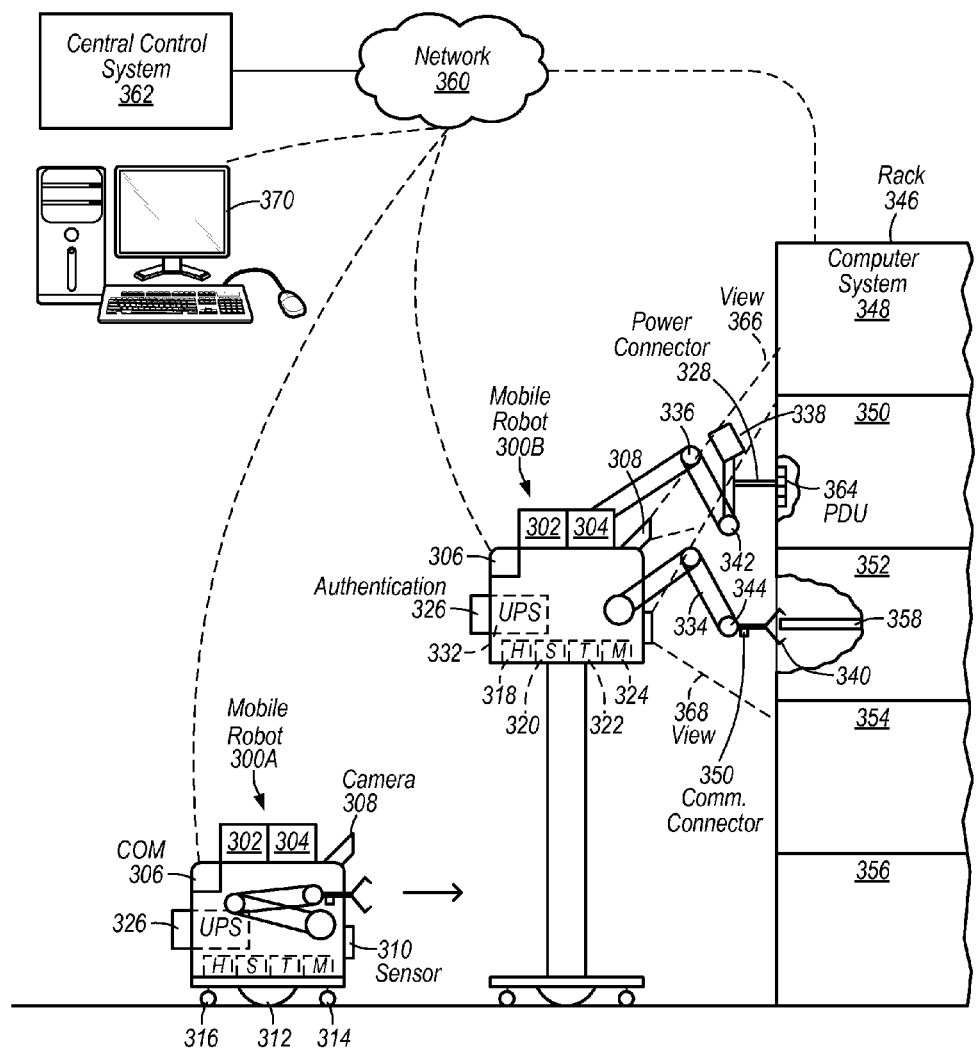
FIG. 3 illustrates a mobile robot interacting with various computer systems in a rack, according to some embodiments.

FIG. 3 illustrates a mobile robot interacting with various computer systems in a rack, according to some embodiments. Mobile robot 300 is depicted in two states. Mobile robot 300A depicts mobile robot 300 in a travelling state and mobile robot 300B depicts mobile robot 300 in an interacting state. Mobile robot 300 includes drive wheel 312, controllable front wheel 314 and controllable back wheel 316. Controllable front wheel 314 and controllable back wheel 316 are controlled by mobile robot 300 to steer mobile robot 300. Mobile robot 300 includes sensor 310 mounted on the front of mobile robot 300. Sensor 310 may be a proximity detector, a camera, or another type of sensor used to navigate. Mobile robot 300 includes camera 308 mounted at the top of the front portion of mobile robot 300. In some embodiments, camera 308 may be mounted in different locations on mobile robot 300. Mobile robot 300 may comprise a computer system that controls camera 308 to navigate and to identify ports and component parts of servers mounted in rack 346. Camera 308 may be remotely controlled by central control system 362 or remote computer system 370. Mobile robot 300 includes network communication interface module 306 that communicatively couples mobile robot 300 to central control system 362 via a remote communication link over network 360. Network 360 also connects central control system 362 to computer systems 348, 350, 352, 354, and 356 mounted in rack 346. Mobile robot 300 includes spare parts storage 302 located on the top of mobile robot 300 and component parts storage 304 located on the top of mobile robot 300.

In some embodiments, mobile robot 300 may traverse a data center by flying. Such a mobile robot 300 may comprise one or more propeller engines, jet engines, etc. that enable mobile robot 300 to fly.

Mobile robot 300B depicts mobile robot 300 interacting with computer systems in rack 346. Mobile robot 300A and 300B depict the same mobile robot 300 in two different positions, all components described in regards to mobile robot 300A are also included in mobile robot 300B. Mobile robot 300 includes manipulable arms 334 and 336, sensor 310, and camera 308. Manipulable arm 334 includes gripping device 340 coupled to manipulable arm 334 by swivel 344. Communication connector 372 is mounted on the side of gripping device 340 near swivel 344. Swivel 344 allows mobile robot 300 to manipulate gripping device 340 so that communication connector 374 is facing a specific computer system and can be engaged into a communication port of a specific computer system or as is shown in FIG. 3, swivel 344 can allow mobile robot 300 to manipulate gripping device 340 so that the gripping device is positioned to engage with a component part of a specific computer, such as component part 358. Mobile robot 300 may use sensor 310 and camera 308 to control manipulation of gripping device 340 and communication connector 374. For example, in FIG. 3 sensor 310 may be a proximity sensor that has a field of view represented by field of view 368. Mobile robot 300 may use sensor 310 for depth perception, so that mobile robot 300 can determine how to manipulate manipulable arm 334 to engage with computer systems in rack 346. Camera 308 may have a field of view represented by field of view 366. Mobile robot 300 may use camera 308 to align gripping device 340 with component part 358, may use camera 308 to align communication connector 374 with a communication port on a specific computer system, etc. In FIG. 3, mobile robot 300B is depicted gripping component part 358 with gripping device 340 and using camera 308 to align gripping device 340 with component part 358 and using sensor 310 to determine the distance to extend gripping device 340 based on the proximity measured by sensor 310. In some embodiments, mobile robot 300 may determine proximity based on images from camera 308 or another camera. In some embodiments, other sensors may be used to control the manipulation of manipulable arm 334. In some embodiments, camera 308 comprises one or more of a thermal imaging camera, infrared camera, etc. and can capture thermal images of one or more portions of computer systems mounted in rack 346.

Central control system 362 may determine that a computer component in computer system 352, which can include a hard disk drive, is to be replaced. Such a determination may be based at least in part upon a determination that the removable hard disk drive is failed. Central control system may send a command to mobile robot 300 to travel to computer system 352 and replace removable hard disk drive 358. Mobile robot 300 may travel to computer system 352 in response to the command from central control system 362 and use camera 308 to identify removable hard disk drive 358. Mobile robot 300 may then use camera 308 to align gripping device 340 with removable hard disk drive 358 and extend gripping device 340 towards computer system 352 by manipulating manipulable arm 334. Mobile robot 300 may control the extension of gripping device 340 based on images from camera 308 and sensor signals from sensor 310. Mobile robot 300 may then grip removable hard disk drive 358 using gripping device 340 and remove removable hard disk drive 358 from computer system 352 by manipulating manipulable arm 334 to pull removable hard disk drive 358 from computer system 352. In some embodiments, other mechanisms may be used to disengage removable hard disk drive from computer system 352, including an eject button or lever. After removing removable hard disk drive 358 from computer system 352, mobile robot 300 may place removable hard disk drive 358 in storage 304 located on top of mobile robot 300. Mobile robot 300 may then identify a replacement hard disk drive located in parts storage compartment 302 located on top of mobile robot 300. In some embodiments, parts storage compartment 302 may include multiple identical replacement parts. In some embodiments, parts storage compartment 302 may include several different replacement parts and mobile robot 300 may use camera 308 to determine the correct replacement part to use by inspecting the several different replacement parts included in parts storage compartment 302. After identifying the correct replacement part, mobile robot 300 may then use gripping device 340 to grip the identified replacement part and insert the identified replacement part into computer system 352.

Manipulable arm 336 includes gripping device 338 and power outlet connector 328 mounted on the side of gripping device 338. Swivel 342 couples gripping device 338 to manipulable arm 336. Swivel 342 allows mobile robot 300 to manipulate gripping device 338 so that it is positioned to grip a component part in a specific computer system or is positioned to engage power outlet connector 328 with a power port. FIG. 3 depicts mobile robot 300B with gripping device 338 positioned so that power outlet connector 328 is engaged with a power port of power distribution unit (PDU) 364. Camera 308 provides a field of view 366 of computer systems in rack 346. View 366 includes computer system 350 and PDU 364 associated with computer system 350. Sensor 310 provides view 368 which includes computer system 350 and PDU 364 associated with computer system 350. Mobile robot 300 may use images from camera 308 to align power outlet connector 328 with a power port in PDU 364. Mobile robot 300 may then extend power outlet connector 328 towards PDU 364. Sensor 310 may be a proximity sensor that determines the distance from mobile robot 300 to rack 346. Mobile robot 300 may then use the proximity measured by sensor 310 to determine the distance to extend manipulable arm 336 so that power outlet connector 328 engages a port in PDU 364. In some embodiments, mobile robot 300 may be able to determine the alignment and depth from camera images received from camera 308. In some embodiments, other combinations of sensors may be used to provide feedback to mobile robot 300 so that mobile robot 300 may manipulate manipulable arm 336 to engage power outlet connector 328 with PDU 364.

In some embodiments, mobile robot 300 identifies a port associated with a specific computer system, such as PDU 364 associated with computer system 350. In some embodiments, mobile robot 300 transmits images and sensor data collected at computer system 350 to central control system 362 via network 360 and central control system 362 identifies a port associated with a specific computer system, such as PDU 364 associated with computer system 350. Central control system 362 then controls the manipulation of manipulable arms 336 and 334 based on images and data from camera 308 and sensor 310 received by central control system 362 via network 360.

In some embodiments, images from camera 308 may be sent to remote computer system 370 via network 360 and a data center technician may remotely control manipulable arms 334 and 336 based on the images received at remote computer system 370.

Central control system 362 may determine that redundant power support to computer system 350 has been lost. In response, central control system may command mobile robot 300 to travel to computer system 350 and provide secondary power support to computer system 350. In response to receiving the command, mobile robot 300 may travel to computer system 350. After arriving at computer system 350, mobile robot 300 may identify PDU 364 based on images from camera 308. In some embodiments, mobile robot 308 may send images from camera 308 to central control system 362 via network 360 and central control system 362 may identify PDU 364. Mobile robot 300 may send images from camera 308 to remote computer system 370 and a data center technician may identify PDU 364. After PDU 364 is identified, mobile robot 300 may position gripping device 338 so that power outlet connector 328 is facing computer system 350. Mobile robot 300 may then align power outlet connector 328 with a power inlet port of PDU 364 based on images from camera 328 and extend manipulable arm 336 so that power outlet connector 328 engages the power inlet port PDU 364. In some embodiments central control system 362 may control manipulable arm 336 to engage power outlet connector 328 with the power inlet port of PDU 364. In some embodiments a data center technician located at remote computer system 370 may control manipulable arm 336 to engage power outlet connector 328 with the power inlet port of PDU 364. Mobile robot 300 may send images from camera 308 and sensor signals from sensor 310 to remote computer system 370 to assist the data center technician in controlling manipulable arm 336 to engage power outlet connector 328 with the power inlet port of PDU 364. After power outlet connector 328 is engaged with the power inlet port of PDU 364 mobile robot 300 may provide secondary power support to computer system 350 via uninterruptible power supply (UPS) 332 included in mobile robot 300 and coupled to power outlet connector 328. In some embodiments UPS 332 may be a common battery that supplies power to mobile robot 300. In some embodiments UPS 332 may be a separate source of stored energy independent of mobile robot 300's power source.

In some embodiments, mobile robot 300B may provide secondary power support to computer system 350 via power connector 328 of manipulable arm 336 and couple communication connector 374 of manipulable arm 334 into communication port 372 of computer system 350. Mobile robot 300B may supply power to computer system 350 to enable computer system 350 to start up via power connector 328 and collect data from computer system 350 via communication connector 374 coupled to communication port 372 subsequent to startup of computer system 350.

Mobile robot 300 includes authentication device 326 located on the back portion of mobile robot 300. Mobile robot 300 may be configured to detect and challenge any data center personnel encountered at a location proximate to a specific computer system. For example, mobile robot 300 may receive a command from central control system 362 to travel to computer system 352 mounted in rack 346. Upon arriving at rack 346, mobile robot 300 may encounter one or more data center personnel already at rack 346. Mobile robot 300 may determine that the encountered personnel are people based at least in part on sensor data from one or more sensors mounted on mobile robot 300 including cameras, heat sensors, or motion detectors. In response to encountering the data center personnel, mobile robot 300 may challenge the personnel to identify themselves. For example, mobile robot 308 may comprise a speaker system that allows mobile robot 300 to communicate with data center personnel by broadcasting a message over the speaker system. The challenge message may instruct the data center personnel to use authentication device 326 to identify themselves. Authentication device 326 may be a magnetic strip reader designed to read magnetic strips included in identification cards issued to data center personnel. Authentication device 326 may also be a proximity card reader designed to sense an identification card by the identification card being placed in close proximity to the authentication device. In some embodiments authentication device 326 may use biometrics to identify data center personnel including fingerprint scans, iris scans, or other forms of biometric identification. In some embodiments other well-known methods of identification may be used by authentication device 326.

Mobile robot 300 includes various environmental sensors including humidity sensor 318, smoke sensor 320, temperature sensor 322, and particulate sensor 324. Environmental sensors mounted to mobile robot 300 may be used to monitor local environmental conditions at rack 346.

In some embodiments, mobile robot 300 may provide images from camera 308 to remote computer system 370 based on mobile robot arriving within a certain proximity of rack 346. For example, mobile robot 300 may provide images from camera 308 to remote computer system 370 based upon arriving within a certain number of floor tiles of rack 346. In some embodiments, mobile robot 300 may provide images from camera 308 to remote computer system 370 based on arriving at a zone associated with a computer system in rack 346. In some embodiments, images from camera 308 may be provided to remote computer system 370 based on a request to provide images regardless of the location of mobile robot 300. In some embodiments, mobile robot 300 may provide images to remote computer system 370 without requiring a request to provide images.

Mobile robot 300 described in FIG. 3 may be mobile robot 208 described in FIG. 2 or mobile robot 102 described in FIG. 1. Rack 346 may represent any of the racks described in FIGS. 1-2.

Figure 4:
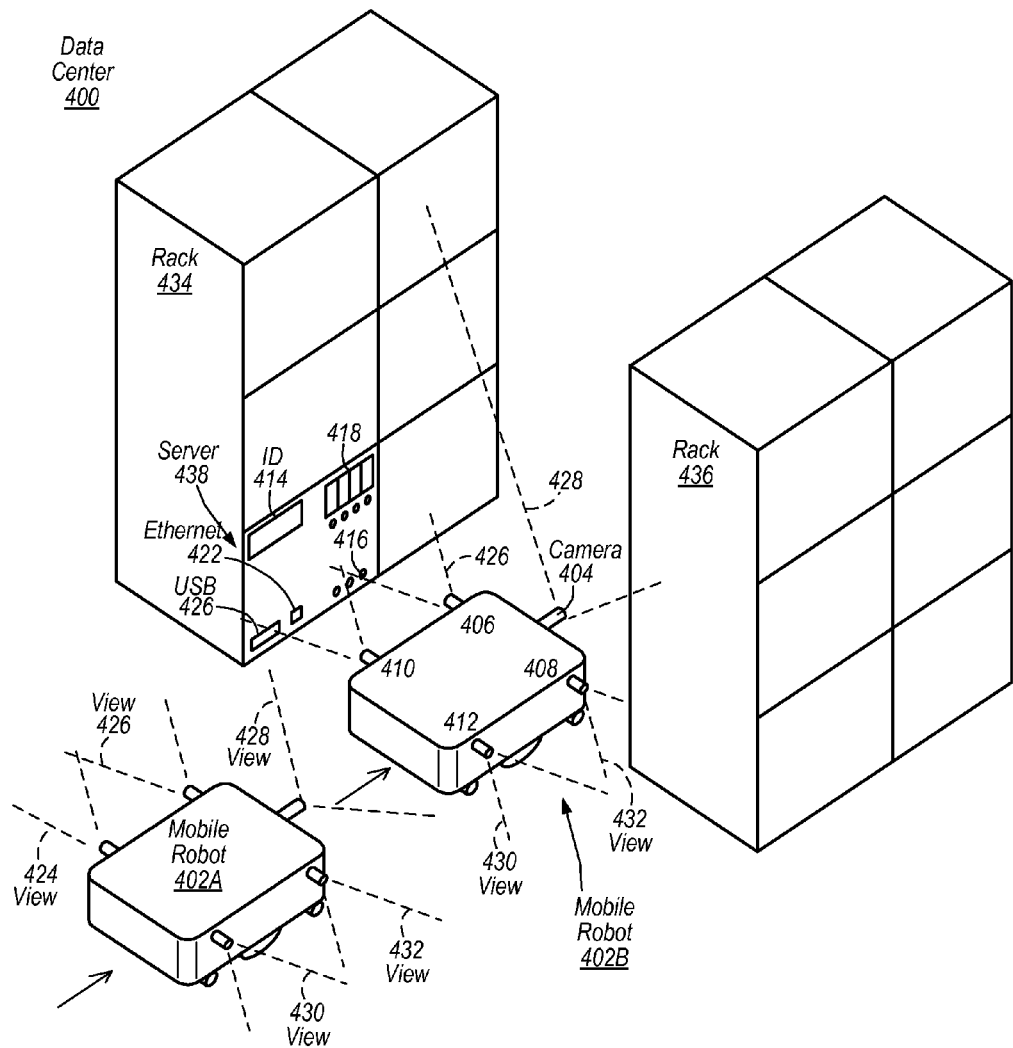
FIG. 4 illustrates a mobile robot observing various computer systems in racks, according to some embodiments.

FIG. 4 illustrates a mobile robot observing various computer systems in racks, according to some embodiments. Mobile robot 402 is depicted in two locations as it travels between racks 434 and 436, mobile robot 402A depicts mobile robot 402 at a first position and mobile robot 402B depicts mobile robot 402 at a second position. Mobile robot 402 includes camera 404 mounted on the front of mobile robot 402, which provides view 428, side cameras 406 and 408 that provide views 426 and 432, and sensors 410 and 412 mounted on the sides of mobile robot 402 and that provide views 424 and 430. In some embodiments side sensors 410 and 412 may be bar code scanners, RFID readers, or other devices that collect and process information from identification tags and status lights mounted on computer systems in racks 434 and 436.

Mobile robot 402 may be performing a recurring computer system interaction task including an inventory of the computer systems in data center 400. Mobile robot 402 may travel between racks of computer systems using sensors 410 and 412 to identify computer systems mounted in racks 434 and 436 as mobile robot 402 travels between racks 434 and 436. For example, mobile robot 402B is depicted at computer system 438. Side sensor 410 has view 424 that includes identification tag 414 mounted on computer system 438. Mobile robot 402 may use information collected from sensor 410 to identify computer system 438 as located in rack 434 and record the information as part of the recurring computer system interaction task. For example, identification tag 414 may be a bar code that identifies computer system 438. Identification tag 414 may also be a RFID tag and sensor 410 may be a radio frequency detector configured to identify RFID tags. In some embodiments other types of identification tags and sensors may be used.

Side cameras 406 and 408 may be used to read indicator lights 416. For example, a red indicator light may indicate an anomaly is occurring with respect to computer system 438 and a green indicator light may indicate normal operation. Mobile robot 402 may be configured to identify red lights based on images received from side cameras 406 and 408. Mobile robot 402 may also be able to correlate a red light with an identification tag observed by sensors 410 and 412 so that mobile robot can generate a notification that a specific computer system such as computer system 438 has indicator light 416 indicating a computer system issue. In some embodiments, other techniques may be used to identify indicator lights indicating a computer system issue, including indicator lights that only light up when there is a computer system issue, comparing an observed indicator light pattern to a stored indicator light pattern and generating a notification if there are any discrepancies, or other similar methods.

In some embodiments, mobile robot 402 may provide images from side cameras to a remote computer system or to a central control system. The remote computer system or the central control system may store the images to keep a surveillance record of the locations and status of computer systems in data center 400.

Mobile robot 402 described in FIG. 4 may be mobile robot 102 described in FIG. 1, mobile robot 208 described in FIG. 2, and mobile robot 300 described in FIG. 3. Racks 434 and 436 may be any of the racks described in FIGS. 1-3.

Figure 5:
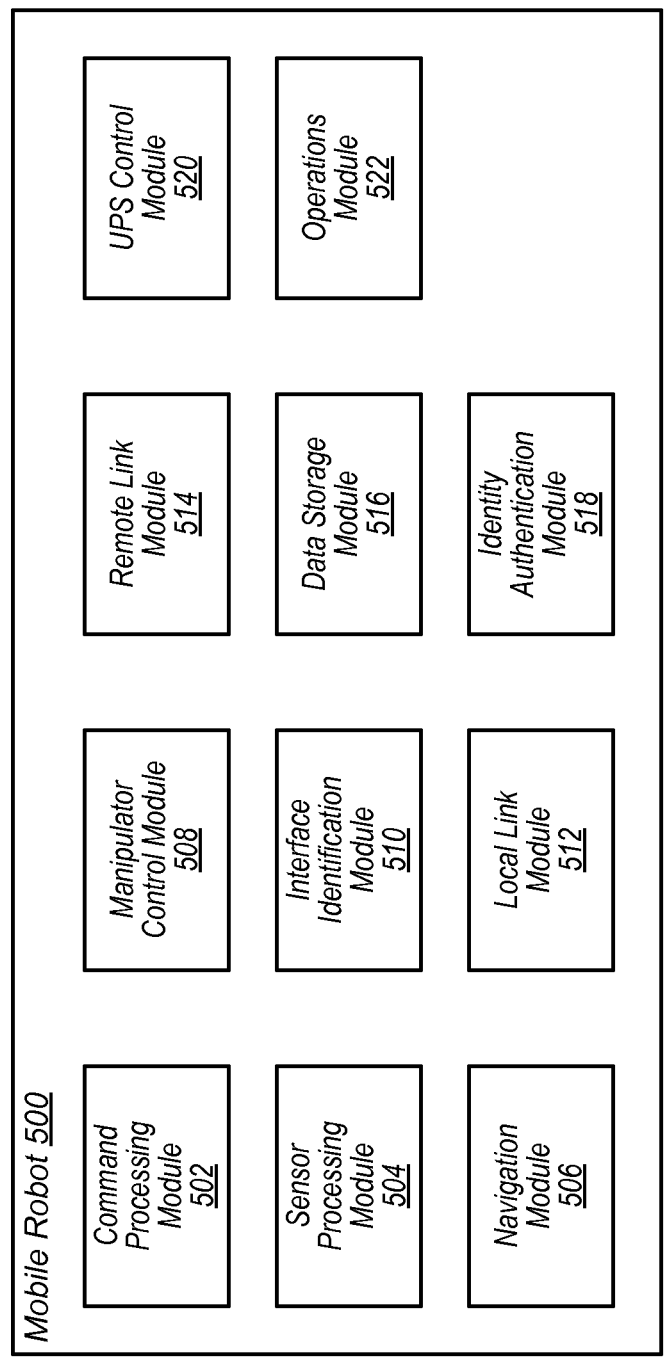
FIG. 5 illustrates a mobile robot, according to some embodiments.

FIG. 5 illustrates a mobile robot, according to some embodiments. Mobile robot 500, in some embodiments, comprises one or more modules, which can be partially or fully implemented by one or more computer systems included in mobile robot 500. Mobile robot 500 comprises command processing module 502, sensor processing module 504, navigation module 506, manipulator control module 508, interface identification module 510, local link module 512, remote communication link module 514, data storage module 516, identity authentication module 518, uninterruptable power supply (UPS) control module 520, and operations module 522. Mobile robot 500 may be mobile robot 102 described in FIG. 1, mobile robot 208 described in FIG. 2, mobile robot 300 described in FIG. 3, and mobile robot 402 described in FIG. 4.

Command processing module 502 may receive a command to mobile robot 500 from a central control system and forward the command to another module. A command from a central control system may instruct mobile robot 500 to travel to a specific computer system in a data center or to conduct a recurring computer system interaction task, including an inventory of the computer systems in a data center, an audit of indicator lights on computer systems in a data center, collection of environmental data in a location proximate to computer systems in a data center, or some other recurring computer interaction task. The command may instruct mobile robot 500 to communicatively couple with a specific computer system, electrically couple to a specific computer system to provide a secondary power supply, replace a failed component in a specific computer system, etc.

Sensor processing module 504 may receive and process sensor signals from various sensors mounted on mobile robot 500. Sensor processing module 504 may provide information based on the received sensor signals to other modules comprised in mobile robot 500. Sensors mounted on mobile robot 500 may include a front camera, one or more side cameras, a front proximity sensor, side computer system identification scanners, a personnel identity authentication device, temperature sensors, humidity sensors, particulate sensors, smoke sensors, and other like types of sensors.

Navigation module 506 may determine a path through a data center for mobile robot 500 to follow to arrive at a specific computer system indicated in a command received at command processing module 502. The command may be forwarded from command processing module 502 to operations module 522, and operations module 522 may inform navigation module 506 of the specific computer system that the mobile robot needs to travel to. In response, navigation module 506 may consult a map stored in memory and determine the best route based on the present location of mobile robot 500 and the commanded destination. In some embodiments, mobile robot 500 is equipped with a gyroscope or compass and accelerometers and navigation module 506 tracks the position of the mobile robot relative to a starting point while travelling through a data center based on data received from the gyroscope or compass and accelerometers. In some embodiments, navigation module 506 may store a map of a data center organized by floor tiles, and sensor processing module 504 may send images of floor tiles traversed as the mobile robot travels through a data center to navigation module 506. Based on receiving the images of floor tiles being traversed as mobile robot 500 travels through a data center, navigation module 506 may determine the current position of mobile robot 500. In some embodiments, navigation module 506 may direct a mobile robot to return to a standby station after completing each task, so that the starting location for calculating a route to a specific computer system is known. In some embodiments, a central control system may determine the path for mobile robot 500 to travel to arrive at a specific computer system and send the determined path to navigation module 506 via command processing module 502. After arriving at the commanded location, navigation module 506 may inform operations module 522 that mobile robot has arrived at the commanded location.

Manipulator control module 508 may control the manipulation of one or more manipulable arms coupled to mobile robot 500. Manipulator control module 508 may be instructed by operations module 522 that mobile robot 500 is located at the commanded specific computer system. Manipulator control module 508 may also receive instructions from command module 502. The instructions may include a command to communicatively couple mobile robot 500 with a specific computer system or electrically couple mobile robot 500 with a specific computer system, replace a component part in a specific computer system. Manipulator control module may control one or more manipulable arms to allow mobile robot 500 to carry out the command. For example, the central control system may command mobile robot 500 to replace a component part in a specific computer system. Operations module 522 may instruct manipulator control module 508 to replace the component part in the specific computer system. Mobile robot 500 may comprise one or more manipulable arms with a gripping device connected to the manipulable arm. Manipulator control module 508 may use images from cameras received by sensor processing module 504 and signals from one or more proximity sensors received by sensor processing module 504 to align and extend the gripping device coupled to the manipulable arm to grip the component part of the specific computer system that is to be changed out according to the command received from the central control system. In some embodiments, control of the one or more manipulable arms coupled to mobile robot 500 may be performed by the central control system or by a data center technician via a remote computer system.

Interface identification module 510 may identify a specific interface on a specific computer system. For example, after arriving at a specific computer system, mobile robot 500 may collect images of the specific computer system. Interface identification module 510 may be able to analyze the images to locate an interface including a USB port, an Ethernet port, etc. Interface identification module 510 may also be able to analyze the images collected of the specific computer system to identify a power port such as a rack level PDU. In some embodiments, the central control system may analyze the images of the specific computer system and identify the specific port and communicate the identified port back to mobile robot 500. In some embodiments mobile robot 500 may identify a specific port without the central control system.

Local link module 512 may establish a local communication link between mobile robot 500 and a specific computer system. For example, the central control system may command mobile robot 500 to travel to a specific computer system and communicatively couple to the specific computer system. Manipulator control module 508 may manipulate one of the one or more manipulable arms of mobile robot 500 to engage a communication connector with a communication port associated with the specific computer system. The communication port and connector may be a USB port and connector, an Ethernet port and connector, or some other type of port and connector. Once the communication connector is engaged in the communication port of the specific computer system, local link module 512 may establish communications with the specific computer system.

Remote communication link module 514 may establish a remote communication link between a specific computer system and a remote computer system via mobile robot 500. For example, after local link module 512 establishes a local link between a specific computer system and mobile robot 500, remote communication link module 514 may establish a communication link between mobile robot 500 and a remote computer system via a network. The network may be a wireless network in a data center or a wired connection. Remote communication link module 514 may then connect the specific computer system to the remote computer system via the local link and the remote link. In some embodiments, the remote computer system may be the central control system. The remote computer system may be a computer system in an operation center monitored by data center personnel. In some embodiments, the remote computer system may be some other computer system.

Data storage module 516 may store data collected from a specific computer system. In some embodiments, mobile robot 500 may store data collected over the local link established by local link module 512 in data storage module 516. For example, operations module 522 or the central control system may determine that a hard drive failure is imminent. Operations module 522 may further determine that there are not any proper replacement parts on hand or that the hard drive suspected of imminent failure cannot be removed. Operations module 522 may instruct data storage module 516 to store all the data on the hard drive suspected of imminent failure. In another example, mobile robot 500 may be configured to analyze data from a specific computer system to diagnose a computer system performance issue. Data storage module 516 may be used to store data collected from a specific computer system while data processing module 518 process the data.

Identity authentication module 518 may process identity information collected from an identity authentication device coupled to mobile robot 500 to authenticate the identity of individuals in a location proximate to a specific computer system. Mobile robot 500 may be configured to detect and challenge any data center personnel encountered at a location proximate to a specific computer system via sensor processing module 504. For example, mobile robot 500 may receive a command from the central control system to travel to a specific computer system. Upon arriving at the specific computer system mobile robot 500 may encounter one or more data center personnel already at the specific computer system. In response to encountering the data center personnel, mobile robot 500 may challenge the personnel to identify themselves. For example mobile robot 500 may comprise a speaker system that allows mobile robot 500 to communicate with data center personnel. The challenge message may instruct the data center personnel to use an authentication device mounted on mobile robot 500 to identify themselves. The authentication device may be a magnetic strip reader designed to read magnetic strips included in identification cards issued to data center personnel. The authentication device may be a proximity card reader designed to sense an identification card by the identification card being placed in close proximity to the authentication device. In some embodiments the authentication device may use biometrics to identify data center personnel including fingerprint scans, iris scans, or other forms of biometric identification. In some embodiments different methods of identification may be used. Identity authentication module 518 processes the identity information collected from the authentication device and compares the information to data center personnel information stored in a database. Identity authentication module 518 then determines the personnel are authorized to be in the location or sends an alert to operations module 522, which then notifies the central control system that non-authorized personnel were located at the specific computer system. In some embodiments, operations module 522 may also record the identity of the data center personnel at the location of the specific computer system as part of an event summary.

Uninterruptible power supply (UPS) control module 520 may monitor and control a UPS mounted on mobile robot 500. For example, the central control system may command mobile robot 500 to provide backup power for a specific computer system. Mobile robot 500 may travel to the specific computer system and couple a power connector to a power port or rack level PDU as described above. After electrically coupling to the specific computer system, UPS control module 520 may monitor the flow of power from the UPS mounted on mobile robot 500. UPS control module 520 may also monitor the remaining power in the UPS mounted on mobile robot 500. If UPS control module 520 determines that the flow of power from the UPS mounted on mobile robot 500 is above a rate such that the remaining power in the UPS will be consumed within a predetermined threshold, UPS control module 520 may notify operations module 522. Operations module 522 may then request that another mobile robot be commanded to the specific computer system to provide additional backup power in the event the UPS mounted on mobile robot 500 is depleted.

Operations module 522 coordinates activities between the various modules in mobile robot 500. Operations module 522 also directs communications from the mobile robot to the central control system via remote link 514.

Figure 6:
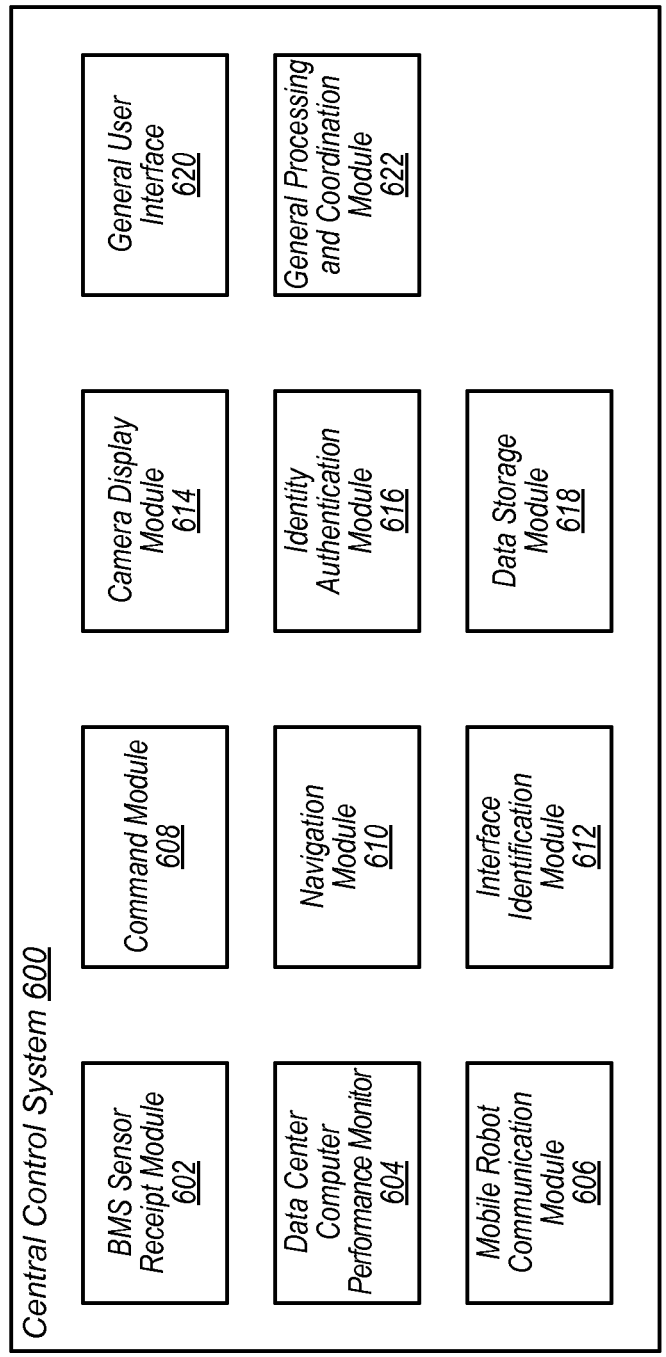
FIG. 6 illustrates a central control system, according to some embodiments.

FIG. 6 illustrates a central control system, according to some embodiments. Central control system 600 comprises building management system (BMS) sensor receipt module 602, data center computer system performance monitor 604, mobile robot communication module 606, command module 608, navigation module 610, interface identification module 612, camera display module 614, identity authentication module 616, data storage module 618, general user interface 620, and general processing and coordination module 622. Central control system 600 may be central control system 152 described in FIG. 1, central control system 204 described in FIG. 2, and central control system 362 described in FIG. 3.

BMS sensor receipt module 602 receives sensor signals from a BMS indicating data center conditions, including temperature, smoke, particulate concentrations, and other like sensor signals. In some embodiments sensor signals may be received by BMS sensor receipt module 602 after being processed by a BMS. In some embodiments sensor signals may be directly routed to BMS sensor receipt module without being processed by a BMS. BMS sensor receipt module 602 sends sensor information to general processing and coordination module 622.

Data center computer performance monitor 604 receives and analyzes computer performance information for computer systems associated with central control system 600 via a network connecting central control system 600 to computer systems in a data center. Computer performance information may include central processing unit (CPU) utilization, energy consumed per instruction executed, latency, bandwidth, and other like computing performance measurements. Data center computer performance monitor 604 may notify general processing and coordination module 622 if analysis of computer performance information indicates an anomaly associated with a specific computer system or group of computer systems. For example, data center computer performance monitor 604 may detect that a specific computer system has an average energy consumed per instruction executed that exceeds a predetermined threshold. A faulty hard drive may be causing the specific computer system to consume additional energy per instruction executed. Data center computer and performance monitor 604 may send a notification to general processing and coordination module 622 that the specific computer system needs to be further investigated and a faulty hard drive is suspected. As discussed below, general processing and coordination module 622 may instruct command module 608 to command a mobile robot to investigate the specific computer system and change the suspected hard drive.

Mobile robot communication module 606 allows central control system 600 to communicate with a mobile robot by establishing a communication connection between the mobile robot and the central control system. Mobile robot communication module 606 may use a network in a data center to wirelessly establish a communication connection with a mobile robot. Mobile robot communication module 606 may establish a communication connection directly with a mobile robot without using a central data center network through a radio frequency transmitter and receiver or other well-known methods for wireless communication.

Command module 608 generates commands to send from central control system 600 to one or more mobile robots. Commands may include a command to conduct a recurring computer system interaction task including inventorying computer systems in a data center or other recurring computer system interaction tasks. Commands may include commanding a mobile robot to travel to a specific computer system and communicatively couple or electrically couple to a specific computer system. Commands may include commanding a mobile robot to travel to a specific computer system and collect environmental data or other like actions. Command module 608 may receive instructions from general processing and coordination module 622, BMS sensor receipt module 602, and data center computer performance monitor 604 instructing command module 608 to send a command to one or more mobile robots.

Navigation module 610 may determine a path from a current location of a mobile robot to a specific computer system. Navigation module 610 may send the determined path to command module 608 or mobile robot communication module 606 to be included in a command to a mobile robot or to be sent to the mobile robot outside of a command. In some embodiments the mobile robot may be configured to determine a path to a specific computer system without receiving a path from central control system 600. In some embodiments, a mobile robot may rely on central control system 600 to supply a path to a specific computer system.

Interface identification module 612 may identify a specific port on a specific computer system based on images received from a mobile robot. For example a mobile robot may arrive at a specific computer system and supply images to central control system 600 via mobile robot communication module 606. Interface identification module 612 may be able to analyze the images to identify a communication port including a USB port, an Ethernet port or other types of communication ports. Interface identification module 612 may identify a power port including a rack level PDU or other type of power port. In some embodiments a mobile robot may rely on central control system 600 to identify a specific port on a specific computer system. In some embodiments, a mobile robot may be configured to identify a specific port on a specific computer system without central control system 600.

Camera display module 614 may allow data center personnel located at a remote computer system to observe real-time images collected from one or more cameras on a mobile robot by requesting and receiving images from one or more cameras mounted on a mobile robot. In some embodiments, camera display module 614 may begin to provide real-time images to data center personnel from a mobile robot upon the mobile robot arriving at a specific computer system. In some embodiments, data center personnel may request a camera feed from a mobile robot regardless of the mobile robot's location. The images may be sent from the mobile robot to central control system 600 via mobile robot communication module 606. Mobile robot communication module 606 may route the images to camera display module 614 which then may route the images to general user interface (GUI) module 620 implemented on a remote computer system. In some embodiments images from a mobile robot may be directly routed to a remote computer system.

Identity authentication module 616 receives identity information from an authentication device mounted on a mobile robot. Identity authentication information may include information collected from an identification card issued to data center personnel, biometric data, or other types of information used to identify a person. Identity authentication module 616 may compare the identity information collected from the authentication device against identity information stored in memory to determine the identity of one or more individuals. If the identity of the individuals cannot be determined or the individuals are not authorized to be in the specific location where the mobile robot is located, identity authentication module 616 may send a notification to general processing and coordination module 622 to alert data center operations of the unauthorized individual.

Data storage module 618 may store data from a specific computer system received via mobile robot communication module 606. A mobile robot may communicatively couple with a specific computer system by engaging a communication connector in a communication port of a specific computer system. The mobile robot may then form a remote link with central control system 600 and send data from the specific computer system to central control system 600 via a remote link established through mobile robot communication module 606. The data may then be stored in data storage module 618.

General user interface (GUI) module 620 allows data center personnel to interact with central control system 600. For example, data center personnel may use a GUI presented on a display of a computer system based on display signals generated by GUI module 620 to modify thresholds that trigger central control system 600 to command a mobile robot to travel to a specific computer system. Data center personnel may use GUI 620 to modify recurring computer interaction tasks, including changing the frequency of a task to inventory computer systems in a data center or changing the frequency of a task to inspect indicator lights on computer systems in a data center. Data center personnel may receive alerts and notification on GUI 620. For example, if identity authentication module determines that there is an unauthorized person in a data center GUI 620 may be instructed to display an alert to alert data center personnel of the unauthorized person in the data center. GUI 620 may be used to remotely control one or more manipulable arms on a mobile robot. For example, GUI 620 may be used to view a camera feed via camera display module 614 and may also be used to receive commands from data center personnel to manipulate one or more manipulable arms on a mobile robot. GUI 620 may also be used to modify the operation of central control system 600 in other ways.

General processing and coordination module 622 receives and sends information from the various modules in central control system 600 in order to coordinate the operation of the different modules. General processing and coordination module 622 may also process inputs from BMS sensor receipt module 602 and data center computer performance monitor 604 to determine if a predetermined threshold has been meet requiring central control system 600 to command a mobile robot to travel to a specific computer system. General processing and coordination module 622 may analyze the data stored in data storage module 618 to determine the cause of an event associated with the specific computer system from which the data was collected. In some embodiments, data received from a specific computer system may be stored as a backup copy and not analyzed. General processing and coordination module 622 may also perform other general processing tasks.

Figure 7A:
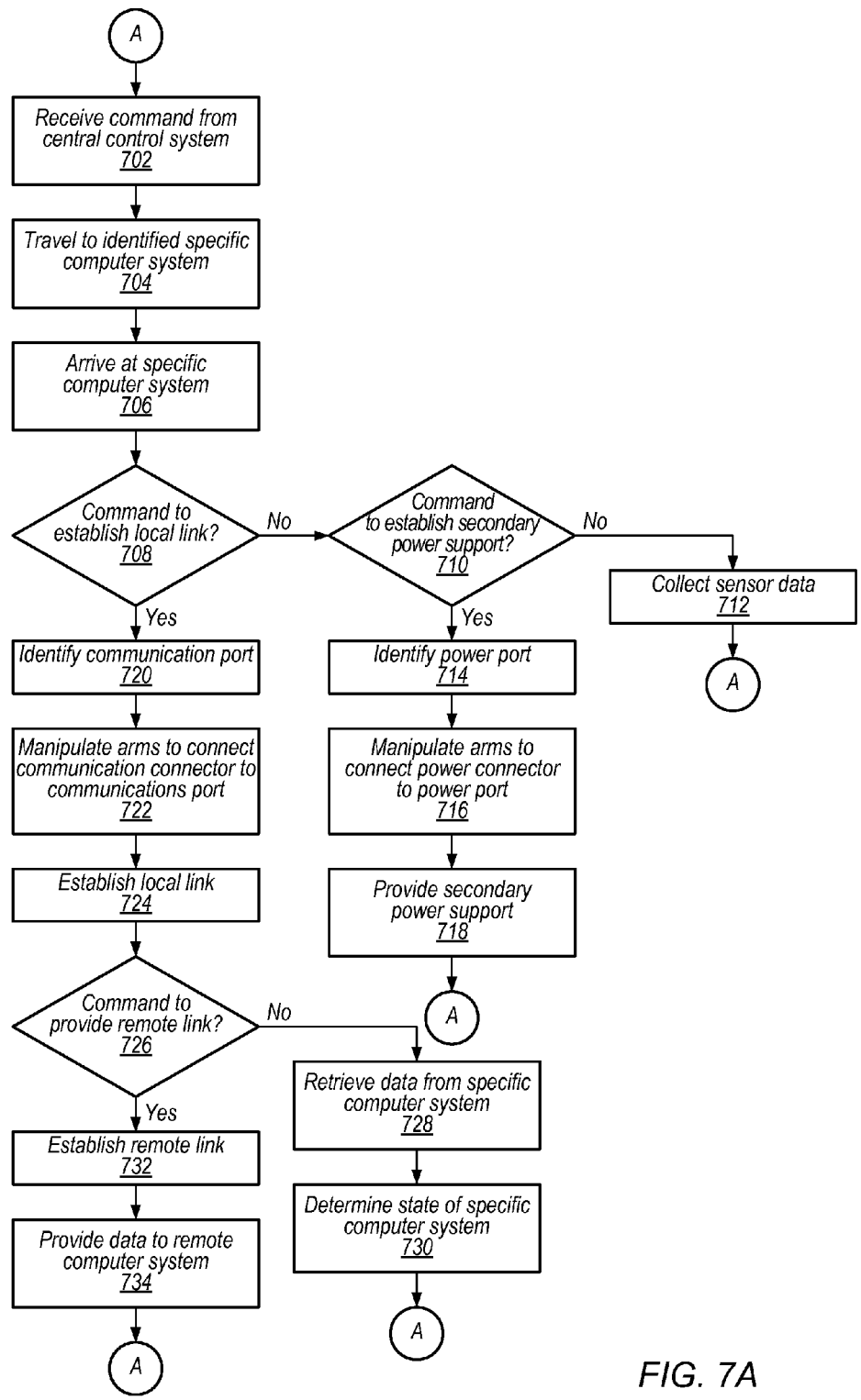
FIG. 7A illustrates interacting with various portions of a data center, according to some embodiments.
Figure 7B:
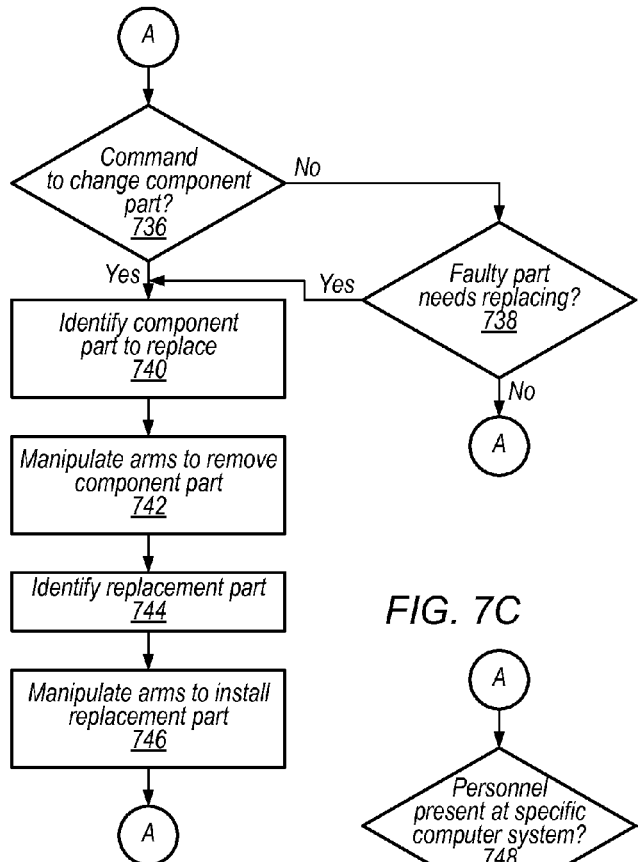
FIG. 7B illustrates interacting with various portions of a data center, according to some embodiments.
Figure 7C:
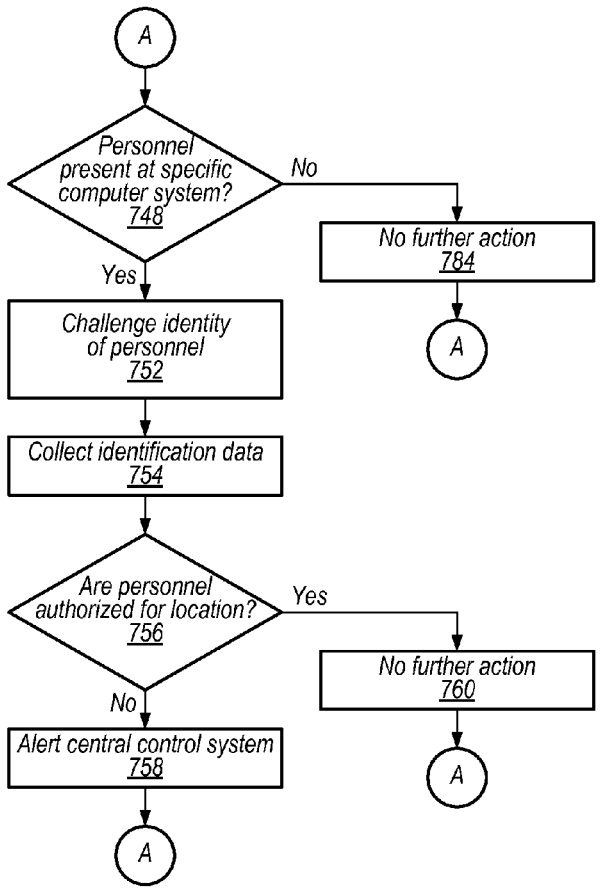
FIG. 7C illustrates interacting with personnel, according to some embodiments.

FIG. 7A illustrates interacting with various portions of a data center, according to some embodiments. Node "A" represents a starting point for the mobile robot. At node "A" the mobile robot may be in a standby location in a data center or may be in the process of completing a previously received command. Also, the mobile robot may loop back to Node A at different points in the operations as shown in FIGS. 7A-7C. FIGS. 7A-7C may describe the operation of any of the mobile robots described in FIGS. 1-6.

At 702, the mobile robot receives a command from a central control system. The command may be a command to perform a recurring computer system interaction task, communicatively couple to a specific computer system, electrically couple to a specific computer system, or collect data from a location proximate to a specific computer system. The command may be based on an anomaly in a specific computer system detected by the central control system, may be an event determined by the central control system based on sensor signals from a BMS in a data center, may be a recurring computer interaction task determined by a clock reaching a predetermined timestamp to trigger the recurring task, may be a command initiated by datacenter personnel through a GUI associated with the central control system, or may be some like command.

The command may be a command to perform a recurring computer system interaction task, communicatively couple to a specific computer system, electrically couple to a specific computer system, or collect data from a location proximate to s specific computer system. The command may be based on an anomaly in a specific computer system detected by the central control system, may be an event determined by the central control system based on sensor signals from a BMS in a data center, may be a recurring computer interaction task determined by a clock reaching a predetermined timestamp to trigger the recurring task, may be a command initiated by datacenter personnel through a GUI associated with the central control system, or may be some like command.

At 704, the mobile robot travels to a specific computer system identified in the command. In some embodiments, the mobile robot may calculate a path to the commanded specific computer system. In some embodiments the command from the central control system may include instructions on the path to follow to arrive at the specific computer system.

At 706, the mobile robot arrives at the specific computer system specified in the command received from the central control system at 702. In some embodiments upon arriving at the specific computer system, the mobile robot may provide a camera feed to a remote computer system so that data center personnel can view the specific computer system. In some embodiments, the mobile robot may only provide a camera feed to a remote computer system when instructed to do so by the central control system.

At 708, the mobile robot determines if the command received from the central control system at 702 is a command to establish a local link between the specific computer system and the mobile robot.

At 710, in response to determining that the command from the central control system is not a command to establish a local link, the mobile robot determines if the command is a command to provide secondary power support to the specific computer system.

At 712, in response to determining at 710 that the command from the central control system is not a command to establish secondary power support, the mobile robot collects sensor data at the specific computer system. Sensor data may include camera images provided over a camera feed to a remote computer system, temperature measurements, humidity measurements, particulate concentration measurements, smoke sensing measurements, and other like measurements.

At 714, in response to determining at 710 that the command from the central control system is a command to establish secondary power support, the mobile robot identifies a power port associated with the specific computer system. The mobile robot may use one or more cameras mounted on the mobile robot to identify the power port. In some embodiments, the mobile robot may send images to the central control system and the central control system may identify the power port. In some embodiments, the mobile robot may send images to a remote computer system and a data center technician may identify the power port.

At 716, the mobile robot manipulates one or more manipulable arms to engage a power connector coupled to one of the manipulable arms into the power port identified at 714. The power connector may also be electrically coupled to an uninterruptible power supply (UPS) mounted on the mobile robot.

At 718, the mobile robot provides secondary power support after engaging the power connector in the power port at 716. The mobile robot may monitor the power level in the UPS while providing secondary power support to the specific computer system. The mobile robot may alert the central control system when the power level in the UPS mounted on the mobile robot falls below a predetermined threshold. In response to receiving an alert from the mobile robot that the power level in the UPS mounted on the mobile robot has fallen below a predetermined threshold, the central control system may command an additional mobile robot to travel to the specific computer system and provide additional secondary power support.

At 720, in response to determining the command from the central control system is a command to establish a local link, the mobile robot may identify a communication interface on the specific computer system. In some embodiments, the mobile robot may identify a communication port on the specific computer system based on images from one or more cameras mounted on the mobile robot. In some embodiments, the mobile robot may provide images from one or more cameras mounted on the mobile robot to the central control system and the central control system may identify a communications port on the specific computer system. In some embodiments, the mobile robot may provide images from one or more cameras to a remote computer system and a data center technician may identify a communication port on the specific computer system based on the images received at the remote computer system.

At 722, the mobile robot manipulates one or more manipulable arms to engage a communication connector coupled to one of the manipulable arms in the communication port identified at 720.

At 724, the mobile robot establishes a local link between the mobile robot and the specific computer system via the communication connector of the mobile robot engaged in the communication port of the specific computer system. The local link allows the mobile robot to send and receive data from the specific computer system.

At 726, the mobile robot determines if the command from the central control system is a command to provide a remote link between the mobile robot and a remote computer system.

At 728, in response to determining at 726 that the command from the central control system is not a command to establish a remote link, the mobile robot retrieves data from the specific computer system. In some embodiments, the mobile robot may capture a backup copy of important information stored in the specific computer system. In some embodiments, the mobile robot may only retrieve data related to the performance of the specific computer system.

At 730, the mobile robot determines the state of the specific computer system based on the data retrieved from the specific computer system at 728. For example, the mobile robot may determine that the read/write performance has deteriorated over time for a hard disk associated with the specific computer system and determine that the state of the specific computer system is not stable. As described in FIG. 7B the mobile robot may further determine to replace one or more components in the specific computer system based on the state of the specific computer system determined at 730.

At 732, in response to determining at 726 that the command from the central control system received at 702 is a command to establish a remote link, the mobile robot establishes a remote link between the mobile robot and a remote computer system. The remote computer system may be the central control system or another remote computer system. The remote computer system may be located in an operations center associated with the data center or may be a computer system not located at the data center. The remote link allows the mobile robot to send information retrieved from the specific computer system via the local link to a remote computer system via the remote link.

At 734, after establishing the remote link at 732, the mobile robot provides data from the specific computer system to a remote computer system.

FIG. 7B illustrates interacting with various portions of a data center, according to some embodiments, and is a continuation of FIG. 7A. Node "A" represents a starting point for the mobile robot. At node "A" the mobile robot may be in a standby location in a data center or may be in the process of completing a previously received command. Also the mobile robot may loop back to Node "A "at different points in the operation as shown in FIG. 7B. Node "A" in FIGS. 7A-7C represent the same node, so that the mobile robot may jump between the operations described in FIGS. 7A-7C.

At 736, the mobile robot determines if the command received at 702 is a command to replace a component part in the specific computer system.

At 738, in response to determining at 736 that the command received at 702 is not a command to replace a component part in the specific computer system, the mobile robot determines if a faulty part in the specific computer system needs to be replaced. For example, the mobile robot may have determined that the specific computer system contains a faulty part at 730 when the mobile robot determined the state of the specific computer system.

At 740, in response to determining at 736 that the command from the central control system received in 702 is a command to replace a component part in the specific computer system or in response to determining at 738 that the specific computer system contains a faulty component part that needs to be replaced, the mobile robot identifies the component part to replace. The mobile robot may identify the component part to replace using one or more cameras mounted on the mobile robot. The mobile robot may use one or more sensors mounted on the mobile robot to determine the component part to replace. For example, the mobile robot may include a thermal sensor and may determine the component part that needs to be replaced by identifying a component part based on its temperature. In some embodiments, the central control system or a data center technician at a remote computer system may identify the component part to replace based on images from one or more cameras mounted on the mobile robot transmitted to the central control system or the remote computer system.

At 742, after identifying the component part to replace at 740, the mobile robot manipulates one or more manipulable arms coupled to the mobile robot to remove the component part from the specific computer system. In some embodiments, component parts including hard disk drives may be removable by pressing an eject button or pulling a lever mounted proximate to the hard disk drive on the specific computer system. In some embodiments, other methods may be used to remove component parts from a specific computer system.

At 744, after removing the component part from the specific computer system at 742, the mobile robot identifies a replacement part to install in place of the removed component part. The mobile robot may store spare replacement parts in a storage bin mounted on the mobile robot. In some embodiments the spare parts stored in the storage bin mounted on the mobile robot may be organized so that the mobile robot knows the type of spare part by its position in the spare parts storage bin. In some embodiments each spare part may comprise a bar code and the mobile robot may selectively retrieve and scan the bar codes of spare parts in the spare parts storage bin until the mobile robot identifies the correct spare part to install based on scanning the bar code of the spare part.

At 746, after identifying the correct spare part to install at 744, the mobile robot manipulates one or more manipulable arms to install the identified replacement part in the specific computer system.

FIG. 7C illustrates operations of a mobile robot in response to encountering data center personnel at a location proximate to a specific computer system. The mobile robot may loop back to Node "A "at different points in the operation as shown in FIG. 7C. Node "A" in FIGS. 7A-7C represent the same node, so that the mobile robot may jump between the operations described in FIGS. 7A-7C.

At 748, the mobile robot determines if any personnel are present at the specific computer system when arriving at the specific computer system.

At 750, in response to determining at 748 that there are not any personnel present at the specific computer system, the mobile robot takes no further action and loops back to node "A".

At 752, in response to determining at 748 that there are personnel present at the specific computer system the mobile robot challenges the personnel present at the specific computer system to identify themselves. The mobile robot may be equipped with a speaker system to communication with the personnel encountered at the specific computer system. In some embodiments, the mobile robot may be equipped with a display to communicate with the personnel encountered at the specific computer system. In some embodiments different equipment or a combination of equipment may be used by the mobile robot to communicate with personnel encountered at a specific computer system.

At 754, the mobile robot collects identification information from the personnel encountered at the specific computer system in response to the challenge issued by the mobile robot for the personnel to identify themselves. The mobile robot may include an identify authentication device for collecting identification information. The device may be configured to collect identification information from a magnetic strip on a data center issued identification card, identification information from a proximity card included in a data center issued identification card, from biometrics including fingerprints and iris scans, or from other like forms of identification.

At 756, the mobile robot determines if the personnel encountered at the specific computer system are authorized to be there. The mobile robot may include a data base of identification information and personnel authorized for various locations in the data center. The mobile robot may compare the identification information collected at 754 with the identification and authorization information stored in a database to determine if the personnel encountered at the specific computer system are authorized to be there. In some embodiments, the mobile robot may not store the identification information and authorization information within its memory and may consult the central control system to determine if the personnel encountered at the specific computer system are authorized to be there.

At 758, in response to determining at 756 that the personnel encountered at the specific computer system are not authorized to be in the location, the mobile robot alerts the central control system. The central control system may then alert data center personnel through a GUI coupled to the central control system.

At 760, in response to determining at 756 that the personnel encountered at the specific computer system are authorized to be in the location, the mobile robot takes no further action.

Figure 8A:
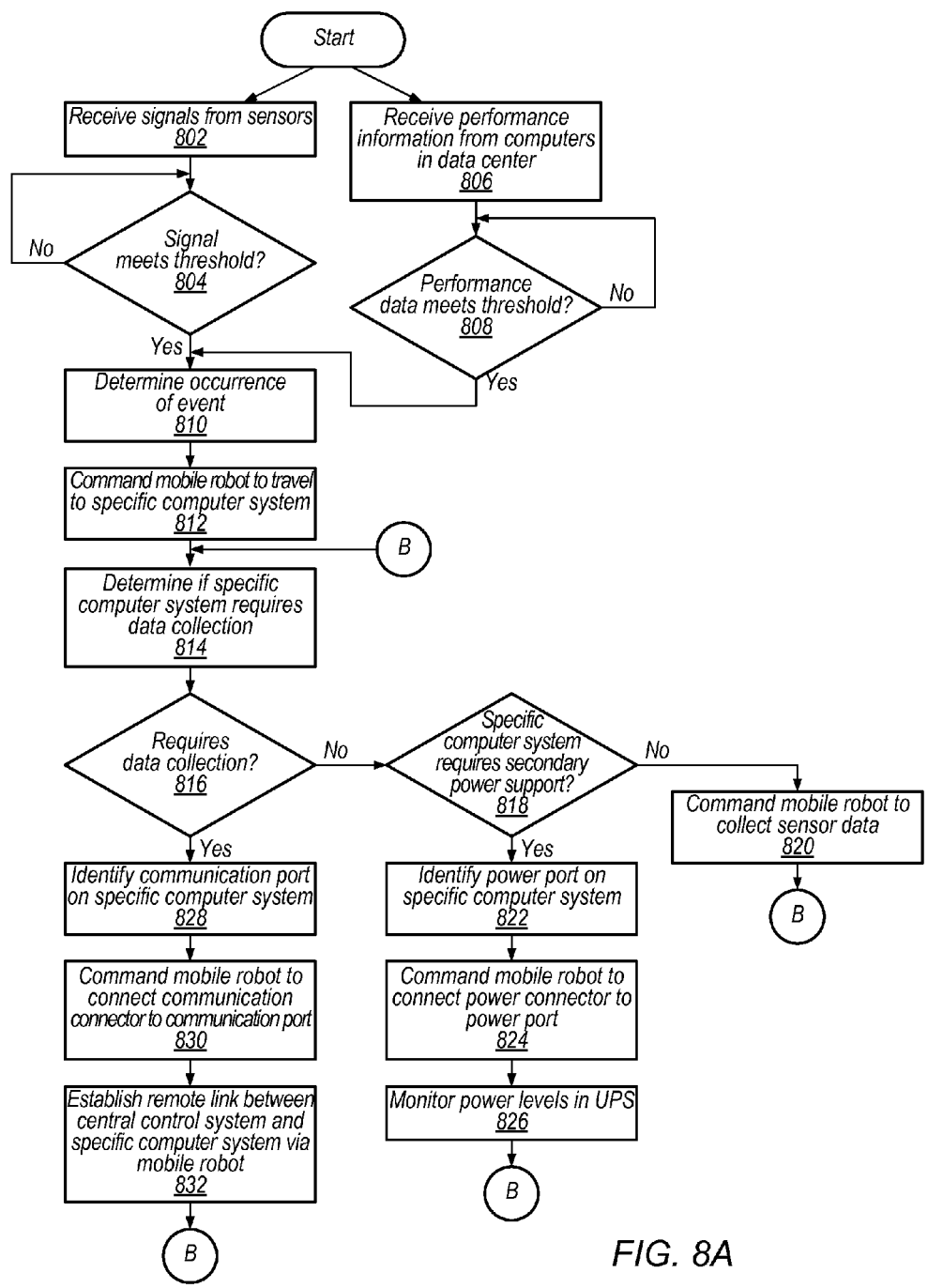
FIG. 8A illustrates responding to an occurrence of an event in a data center, according to some embodiments.
Figure 8B:
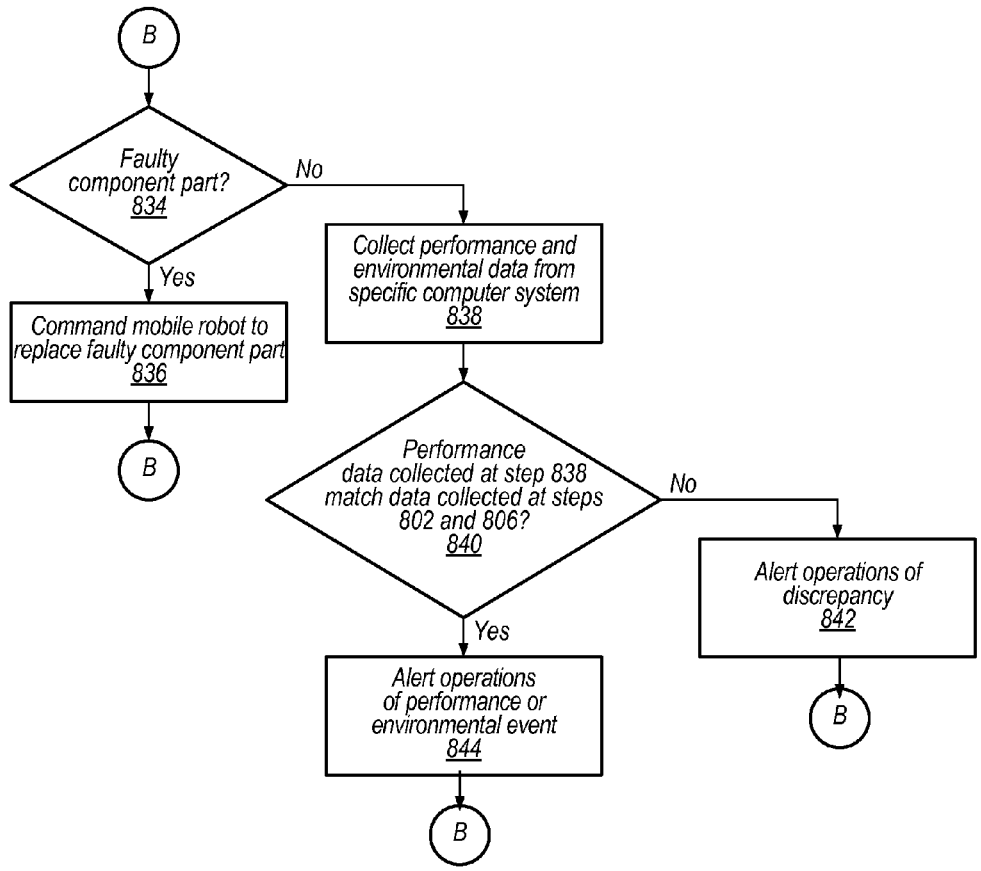
FIG. 8B illustrates responding to an occurrence of an event in a data center, according to some embodiments.
Figure 8C:
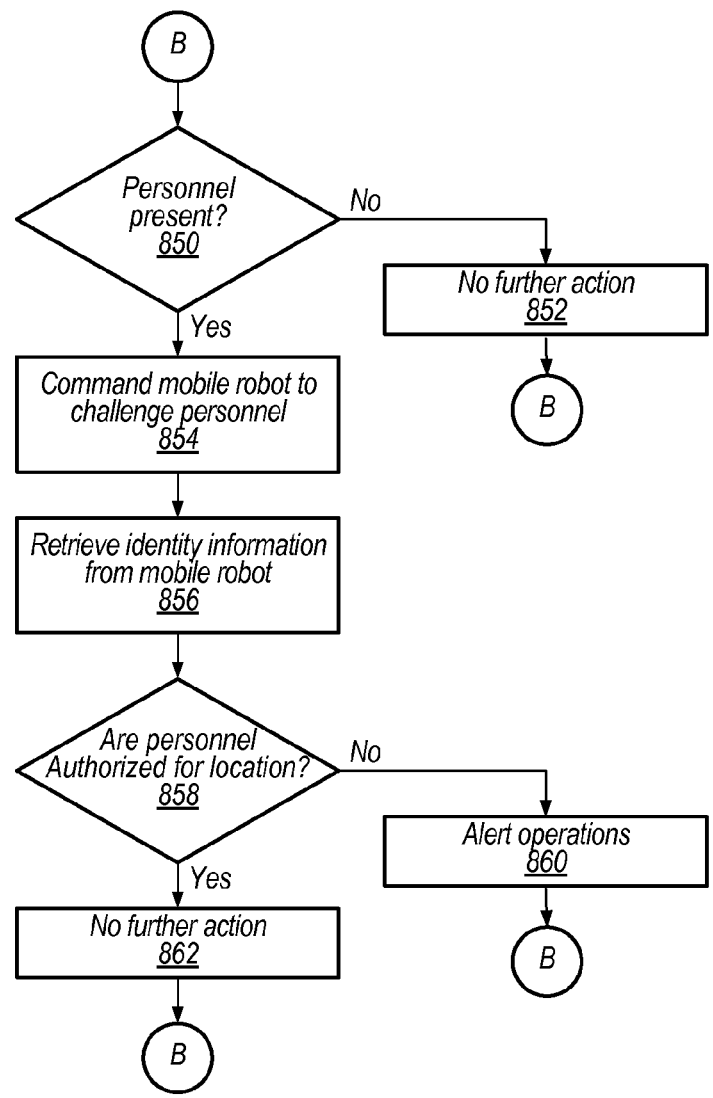
FIG. 8C illustrates responding to an occurrence of an event, according to some embodiments.

FIG. 8A-8C illustrate a central control system identifying and responding to an occurrence of a computer system issue in a data center, according to some embodiments. Node "B" represents a point where the mobile robot is located at a specific computer system. The mobile robot may perform different sets of tasks concurrently or in series as is shown in FIGS. 8A, 8B, and 8C by the different operations that begin at node "B" and loop back to node "B." The operation of the central control system described in FIGS. 8A-8C may describe the operation of any of the central control systems in FIGS. 1-7.

At 802, the central control system receives sensor signals from sensors associated with specific computer systems. The sensors may include, temperature sensors, humidity sensors, smoke sensors, particulate concentration sensors, and other like sensors. In some embodiments, sensor signals may be routed to the central control system. In some embodiments, sensor signals may be routed to a BMS and the central control system may communicate with the BMS to determine the sensor signals. In some embodiments sensor signals may be concurrently routed to the central control system and a BMS.

At 804, the central control system determines if one or more of the sensor signals received at 802 meets one or more predetermined thresholds. In some embodiments, a BMS may determine if the sensor signals meet a predetermined threshold and relay the occurrence of an event in which a sensor signal exceeded a predetermined threshold to the central control system. In some embodiments, the central control system may determine if one or more sensor signals meet a predetermined threshold itself. In some embodiments, the predetermined thresholds may be adjusted through a general user interface (GUI). If there are not any sensor signals that meet one or more predetermined thresholds, the central control system loops back to 804 and continues to monitor sensor signals to determine if a sensor signal meets or exceeds a predetermined threshold.

At 806, the central control system receives sets of computing performance information from one or more computer systems located in a data center via a network linking the central control system to the one or more computer systems. The sets of computing performance information may include central processing unit (CPU) utilization, energy consumed per instruction executed, latency, bandwidth, and other like factors relating to the performance of a computer system.

At 808, the central control system determines if one or more of the sets of computing performance information received at 806 meet one or more computing performance thresholds. For example CPU utilization may have a predetermined threshold of 90% utilization, the central control system may monitor to determine if the CPU utilization of a specific computer system exceeds 90% for a set amount of time. If none of the sets of computer performance information meet one of the predetermined thresholds, the central control system loops back to 808 and continues to monitor computer performance information to determine if a set of computer performance information meets or exceeds a predetermined threshold. In a similar manner to the predetermined thresholds with respect to sensor signals, the predetermined thresholds for computer performance may be adjusted by data center personnel via a GUI.

At 810, the central control system determines the occurrence of an event based on an affirmative determination at 804 and/or 808.

At 812, the central control system commands one or more mobile robots to travel to a specific computer system associated with the occurrence of an event determined at 812. In some embodiments, the central control system may include detailed directions on how the mobile robot should travel to the specific computer system. In some embodiments, the command may only specify a specific computer system or a location within a data center and the mobile robot may compute the directions for arriving at the specific computer system or location within the data center.

At 814, the central control system determines if the specific computer system requires data collection. The central control system may determine that a network connection to the specific computer system is non-responsive and data needs to be collected from the specific computer system. The data collected from the specific computer system may be used to determine the cause of the occurrence of the event determined at 810. The data collected may also be stored to provide a backup copy of data from the specific computer system to protect against data loss in the event of a failure of the specific computer system.

At 816, the central control system decides whether or not to collect data from the specific computer system based on the determination from 814.

At 818, in response to deciding that data does not need to be collected from the specific computer system at 816, the central control system determines if the specific computer system requires secondary power support. If the specific computer system has lost feed from a backup power supply, the central control system may determine that the specific computer system requires secondary power support. Also, in the event of a loss of both primary and backup power supply, the central control system may determine that a specific computer system requires power support and command a mobile robot to travel to the specific computer system to provide power support.

At 820, in response to determining at 816 that the specific computer system does not require data retrieval and determining at 818 that the specific computer system does not require secondary power support, the central control system commands the mobile robot to collect sensor data from a location proximate to the specific computer system associated with the occurrence of the event determined at 810. For example, the event may be a high temperature event based on a sensor signal from a temperature sensor near the specific computer system. The central control system may command the mobile robot to the location of the specific computer system to collect data including temperature, humidity, and images from a camera mounted on the mobile robot to allow data center personnel to investigate the occurrence of an event.

At 822, in response to determining at 818 that the specific computer system requires secondary power support, the central control system identifies a power port associated with the specific computer system. The central control system may use images received from the mobile robot to identify the power port. In some embodiments, the mobile robot may identify the power port.

At 824, after identifying a power port at 822, the central control system commands the mobile robot to connect a power connector coupled to one of the one or more manipulable arms of the mobile robot to the identified power port. In some embodiments, the mobile robot may control the manipulable arms to engage the power connector in the power port. In some embodiments, the central control system may control the manipulable arms to engage the power connector in the power port. In some embodiments a data center technician may control the one or more manipulable arms based on a camera feed supplied to a remote computer system.

At 826, the central control system monitors power levels in an uninterruptable power supply (UPS) mounted on the mobile robot while the mobile robot provides secondary power support to the specific computer system. If the UPS power level drops below a threshold, the central control system may command an additional robot to travel to the specific computer system to provide secondary power support.

At 828, in response to determining at 816 that the specific computer system requires data retrieval, the central control system identifies a communication port on the specific computer system. The central control system may use images received from a camera mounted on the mobile robot to identify a communication port. In some embodiments, the mobile robot may identify a communication port without assistance from the central control system. In some embodiments, a data center technician may identify a communication port based on images received at a remote computer system.

At 830, the central control system commands the mobile robot to connect a communication connector coupled to one of the mobile robots one or more manipulable arms to the identified communication port of the specific computer system.

At 832, the central control system establishes a remote link with the specific computer system via the mobile robot connected to the communication port of the specific computer system. The central control system may then retrieve data from the specific computer system or access data stored on the specific computer system.

FIG. 8B illustrates a central control system identifying and responding to an occurrence of a computer system issue and is a continuation of FIG. 8A, according to some embodiments. At 834, the central control system determines if the specific computer system includes a faulty component part that needs to be replaced. The central control system may make this determination based on the sensor signals received at 802, the computing performance information received at 806, sensor signals and images collected from a location proximate to the specific computer system at 820, and from data retrieved from the specific computer system at 832.

At 836, the central control system commands the mobile robot to replace the faulty component part. The mobile robot then identifies the faulty component part, a proper replacement part, and manipulates the one or more manipulable arms of the mobile robot to remove the faulty component part and install the proper replacement part.

At 838, in response to determining that the specific computer system does not include a faulty component part, the central control system commands the mobile robot to collect computer performance information from the specific computer system and environmental data from a location proximate to the specific computer system.

At 840, the central control system validates the environmental sensors and the sources of the computing performance information. The central control system compares environmental data collected by the mobile robot at the location proximate to the specific computer system to environmental data collected by the environmental sensors mounted in the data center and received at 802. The central control system also compares computing performance information collected at the specific computer system from the connection between the communication connector of the mobile robot and the communication port of the specific computer system and also from indicator lights on the specific computer system with computing performance information from a network in the data center and received at 806.

At 842, in response to determining two sets of information compared at 840 do not match, the central control system alerts data center operations of a discrepancy through a message on the GUI of the central control system.

At 844, in response to determining the sets of information do match, the central control system validates the occurrence of an event at 810 and alerts data center operations of an ongoing event through a message on the GUI of the central control system.

FIG. 8C illustrates a central control system responding to a mobile robot encountering data center personnel at a specific computer system, according to some embodiments. FIG. 8C is a continuation of FIGS. 8A and 8B. Node "B" in FIG. 8C represents the same node "B" as shown in FIGS. 8A and 8B. At 850, the central control system determines if there are personnel present at the specific computer system based on images and sensor data received from the mobile robot upon arriving at the specific computer system.

At 852, in response to determining at 850 that there are not personnel present at the specific computer system, the central control system takes no further action. The central control system then loops to node "B".

At 854, in response to determining at 850 that there are personnel present at the specific computer system, the central control system commands the mobile robot to challenge the personnel present at the specific computer system to identify themselves.

At 856, the central control system receives identification information from the personnel at the specific computer system collected by the mobile robot. The mobile robot may comprise an authentication device for collecting identification information including a magnetic strip reader, a proximity card reader, a fingerprint reader, an iris scanner, or other like devices for collecting identification information.

At 858, the central control system determines if the personnel located at the specific computer system are authorized for that location based on the identification information collected at 856 and a database of identification and authorization information.

At 860, in response to determining at 858, that the personnel at the specific computer system are not authorized for that location, the central control system alerts data center operations by sending a message to a GUI coupled to the central control system.

At 862, in response to determining at 858, that the personnel at the specific computer system are authorized for that location, the central control system takes no further action.

Figure 9:
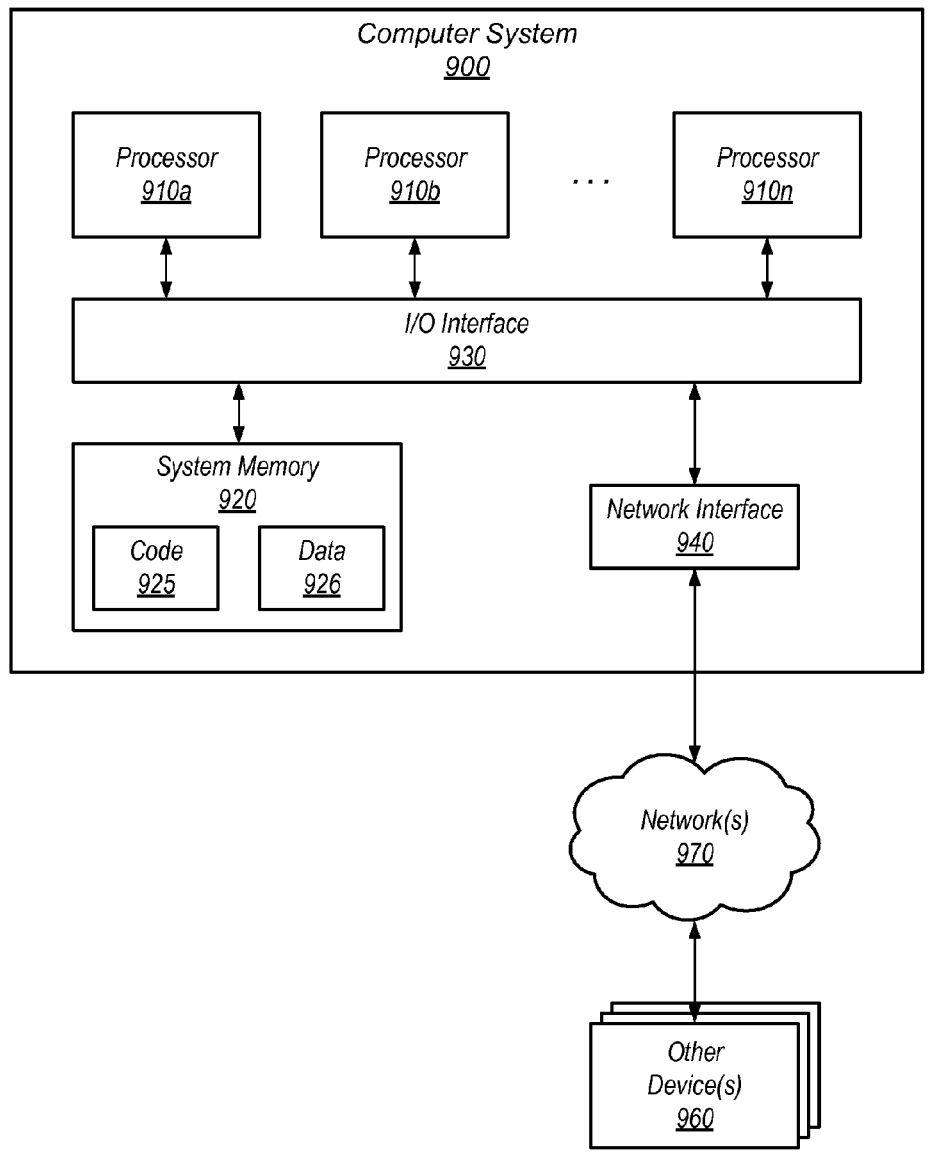
FIG. 9 illustrates a block diagram of an example computer system that may be used in some embodiments.

FIG. 9 is a block diagram illustrating an example computer system that may be used in some embodiments.

In some embodiments, a system that implements a portion or all of one or more of the technologies, including but not limited to a portion or all of the central control system or mobile robot, one or more modules included in the central control system or mobile robot, and various systems, devices, and apparatuses as described herein, may include a general-purpose computer system that includes or is configured to access one or more computer system-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as a portion or all of the power infrastructure, one or more modules included in the power monitoring system, and various power management methods, systems, devices, and apparatuses as described herein, are shown stored within system memory 920 as code 925 and data 926.

In some embodiments, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIGS. 1 through 8, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fiber Channel SANs, or via any other suitable type of network and/or protocol.

In some embodiments, system memory 920 may be some embodiments of a computer system-accessible medium configured to store program instructions and data for implementing embodiments of power management methods as described above relative to FIGS. 1-8. In other embodiments, program instructions and/or data may be received, sent or stored upon different types of computer-accessible media. Generally speaking, a computer system-accessible medium may include non-transitory storage media or memory media such as magnetic or optical media, e.g., disk or DVD/CD coupled to computer system 900 via I/O interface 930. A non-transitory computer system-accessible storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link such as may be implemented via network interface 940.

Various embodiments may further include receiving, sending or storing instructions and/or data implemented in accordance with the foregoing description upon a computer-accessible medium. Generally speaking, a computer system-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
a mobile robot comprising one or more manipulable arms and one or more communication connectors coupled to the one or more manipulable arms, wherein the mobile robot is configured to:
  travel within a data center to a location proximate to a specific computer system of a plurality of computer systems in the data center,
  identify a specific communication port on the specific computer system, and
  communicatively couple the mobile robot with the specific computer system via the identified specific communication port to establish a local communication link between the mobile robot and the specific computer system, wherein, to establish a local communication link between the mobile robot and the specific computer system, the mobile robot is configured to:
    manipulate at least one of the one or more manipulable arms to engage the one or more communication connectors coupled to the one or more manipulable arms with the identified specific communication port on the specific computer system; and a central control system comprising one or more computers communicatively coupled with the mobile robot, wherein the central control system is configured to:
  command the mobile robot to travel to the specific computer system and establish the local communication link to establish a remote communication link between the central control system and the specific computer system via the mobile robot, and
  receive data from the specific computer system via the established remote communication link between the central control system and the specific computer system, based at least in part on the establishing of the local communication link between the mobile robot and the specific computer system.

2. The system of claim 1, wherein the central control system is further configured to:
determine an occurrence of an event associated with the specific computer system based at least in part on one or more sensor signals received from one or more sensors associated with the specific computer system meeting one or more predetermined thresholds, and
command the mobile robot to travel to the specific computer system and establish the local communication link with the specific computer system based at least in part on determining the occurrence of the event.

3. The system of claim 2, wherein:
determining an occurrence of an event based at least in part on one or more sensor signals received from one or more sensors meeting one or more predetermined thresholds comprises determining an occurrence of a recurring computer system interaction task based at least in part upon determining that a time signal, received from one or more clocks, matches at least one predetermined timestamp, and
commanding the mobile robot to travel to the specific computer system and establish the local communication link with the specific computer system comprises commanding the mobile robot to interact with the specific computer system based at least in part on determining the occurrence of the recurring computer system interaction task.

4. The system of claim 2, wherein:
determining an occurrence of an event based at least in part on one or more sensor signals received from one or more sensors meeting one or more predetermined thresholds comprises determining an occurrence of a computing performance event associated with the specific computer system, based at least in part on the sensor signal indicating that computing performance associated with the specific computer system at least meets a predetermined computer performance threshold, and
commanding the robot to travel to the specific computer system and establish the local communication link with the specific computer system comprises commanding the mobile robot to travel to the specific computer system and communicatively couple with the specific computer system based at least in part on determining that computing performance associated with the specific computer system at least meets the predetermined computer performance threshold.

5. An apparatus, comprising:
a mobile robot comprising one or more manipulable arms and one or more connectors coupled to the one or more manipulable arms, wherein the mobile robot is configured to:

identify a specific port associated with a specific computer system in a data center, based at least in part upon observation of a local space proximate to the specific computer system, wherein the specific port comprises a communication port or a power port associated with the specific computer system; and establish a local communication link or power link between the mobile robot and the specific computer system via the identified specific port, based at least in part upon the identifying;

wherein, to establish the local link, the mobile robot is configured to:

manipulate the one or more manipulable arms to engage the one or more connectors coupled to the one or more manipulable arms with the identified specific port.

6. The apparatus of claim 5 wherein:

the mobile robot comprises an uninterruptible power supply;

the one or more connectors coupled to the one or more manipulable arms comprise a power outlet connector configured to distribute power from the uninterruptible power supply;

to identify the specific port associated with the specific computer system, the mobile robot is configured to identify a power inlet port configured to couple with the power outlet connector coupled to the one or more manipulable arms;

to establish the local link between the mobile robot and the specific computer system, the mobile robot is configured to:

manipulate the one or more manipulable arms to engage the power output connector coupled to the one or more manipulable arms with the identified power inlet port to electrically couple the uninterruptible power supply to at least the specific computer system; and provide secondary power support to at least the specific computer system via the uninterruptible power supply.

7. The apparatus of claim 5 wherein the mobile robot is configured to:

collect data from the specific computer system via the established local link with the specific computer system; and determine a present state associated with the specific computer system, based at least in part upon processing the collected data.

8. The apparatus of claim 5 wherein:

the mobile robot comprises a network communication interface configured to establish a remote communication link with a remote computer system via a communication network; and the mobile robot is configured to establish a remote communication link between the remote computer system and the specific computer system, based at least in part upon both the remote communication link between the remote computer system and the mobile robot and the local link between the mobile robot and the specific computer system.

9. The apparatus of claim 5, wherein, to travel to the location proximate to a specific computer system the mobile robot is configured to:

travel to a target location proximate to a target specific computer system based at least in part on receiving, from a remote computer system, a command signal instructing the mobile robot to travel to the target location.

10. The apparatus of claim 5 wherein the mobile robot is further configured to:

identify a component part installed in a portion of the specific computer system, based at least in part upon observation of the local space proximate to the specific computer system;

manipulate the one or more manipulable arms to remove the identified component part in the portion of the specific computer system;

identify a replacement component part, based at least in part on observation of the identified component part; and manipulate the one or more manipulable arms to install the identified replacement part in the portion of the specific computer system from which the identified component part was removed.

11. A method, comprising:

performing by one or more computing devices:

determining an occurrence of an anomaly associated with a specific computer system of a plurality of computer systems based at least in part on one or more received sensor signals indicating that computing performance associated with the specific computer system at least meets a threshold level; and commanding one or more mobile robots, based at least in part upon determining the occurrence of the anomaly, to:

travel to a location proximate to the specific computer system;

identify a specific port associated with the specific computer system based on observation of a local space proximate to the specific computer system;

establish a local communication link between the one or more mobile robots and the specific computer system via the identified specific port; and collect data associated with the specific computer system via one or more interfaces of the one or more mobile robots, wherein the one or more computing devices performing said determining and said commanding are remote from the one or more mobile robots.

12. The method of claim 11, wherein, to establish the local communication link between the one or more mobile robots and the specific computer system, the one or more mobile robots are configured to:

manipulate one or more manipulable arms of the one or more mobile robots to engage a connector coupled to the one or more manipulable arms with the identified specific port; and collect data from the specific computer system via the established local communication link.

13. The method of claim 11, wherein identifying a specific port associated with specific computer system comprises:

identifying the specific port associated with the specific computer system based on analysis of image data received from a camera of the one or more mobile robots.

14. The method of claim 11 wherein said collecting data comprises:

establishing a remote communication link between the one or more computing devices and the specific computer system via the established local communication link, and collecting data at the one or more computing devices via the established remote connection.

\* \* \* \* \*